US011943136B2

(12) United States Patent
Eckert et al.

(10) Patent No.: US 11,943,136 B2
(45) Date of Patent: *Mar. 26, 2024

(54) ADVANCED PREFERRED PATH ROUTE GRAPH FEATURES IN A NETWORK

(71) Applicant: HUAWEI TECHNOLOGIES CO., LTD., Shenzhen (CN)

(72) Inventors: Toerless Eckert, Mountain View, CA (US); Uma S. Chunduri, Fremont, CA (US); Yingzhen Qu, San Jose, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 377 days.

This patent is subject to a terminal disclaimer.

(21) Appl. No.: 17/177,469

(22) Filed: Feb. 17, 2021

(65) Prior Publication Data
US 2021/0176168 A1  Jun. 10, 2021

Related U.S. Application Data

(63) Continuation of application No. PCT/US2019/045980, filed on Aug. 9, 2019.
(Continued)

(51) Int. Cl.
*H04L 45/00* (2022.01)
*H04L 45/02* (2022.01)
(Continued)

(52) U.S. Cl.
CPC .............. *H04L 45/34* (2013.01); *H04L 45/02* (2013.01); *H04L 45/22* (2013.01); *H04L 45/24* (2013.01);
(Continued)

(58) Field of Classification Search
None
See application file for complete search history.

(56) References Cited

U.S. PATENT DOCUMENTS 11,502,940 B2 * 11/2022 Retana .................... H04L 45/34
2006/0193252 A1 * 8/2006 Naseh ..................... H04L 45/28
370/225
(Continued)

OTHER PUBLICATIONS

Chunduri, Uma S.; U.S. Appl. No. 62/634,425; Title: "Advertising and Programming a Non-Shortest Path Forwarding Identifier in Interior Gateway Protocols"; filed Feb. 23, 2018.
(Continued)

*Primary Examiner* — Xavier S Wong
(74) *Attorney, Agent, or Firm* — Conley Rose, P.C.

(57) ABSTRACT

A method implemented by a network element (NE) in a network, comprising receiving, by the NE, preferred path route (PPR) information comprising a PPR identifier (PPR-ID) and a plurality of PPR-Path Description Elements (PPR-PDEs), wherein a PPR-PDE describing the egress NE comprises a destination flag, an anycast PPR-ID, and an anycast group PPR-ID associated with the egress NE, and updating, by the NE, a forwarding database to include a forwarding entry for the egress NE, wherein the forwarding entry includes the PPR-ID, the anycast PPR-ID, and the anycast group PPR-ID, and wherein the forwarding entry indicates a next element on the PPR graph by which to forward an anycast data packet comprising the anycast PPR-ID.

20 Claims, 18 Drawing Sheets

Related U.S. Application Data

(60) Provisional application No. 62/719,338, filed on Aug. 17, 2018.

(51) Int. Cl.
    *H04L 45/24*       (2022.01)
    *H04L 45/302*    (2022.01)
    *H04L 45/52*      (2022.01)
    *H04L 45/745*    (2022.01)

(52) U.S. Cl.
    CPC ............ *H04L 45/302* (2013.01); *H04L 45/52* (2013.01); *H04L 45/745* (2013.01)

(56) References Cited

U.S. PATENT DOCUMENTS

| | | | | |
|---|---|---|---|---|
| 2016/0352623 | A1* | 12/2016 | Jayabalan | H04L 45/026 |
| 2018/0062879 | A1* | 3/2018 | Alexander | H04L 45/122 |
| 2018/0227212 | A1* | 8/2018 | Ferguson | H04L 45/122 |
| 2021/0092041 | A1* | 3/2021 | Eckert | H04L 47/17 |

OTHER PUBLICATIONS

Chunduri, U., et al.,; U.S. Appl. No. 62/663,115; Title: "Resource Reservations and Maintenance For Preferred Paths In The Network Through Routing Protocols," filed Apr. 26, 2018.

Retana, A., et al.,; U.S. Appl. No. 62/666,946; Title: "Explicit and Preferred Fast Re-Route Alternatives for Preferred Path Routes (PPR)," filed: May 4, 2018.

Zakharchenko, V., et al.,; U.S. Appl. No. 62/680,356; Title: "Preferred Path Routing (PPR) with Graph Structures," filed Jun. 4, 2018.

Bashandy, A., et al., "Topology Independent Fast Reroute using Segment Routing," draft-bashandy-rtgwg-segment-routing-ti-lfa-04, Mar. 30, 2018, 18 pages.

Bashandy, A., et al., "Loop avoidance using Segment Routing," draft-bashandy-rtgwg-segment-routing-uloop-03, Apr. 2, 2018, 7 pages.

Chunduri, U., "BGP Link-State extensions for NSPF ID," draftchunduri-idr-bgp-ls-nspfid-00, Apr. 2, 2018, 7 pages.

Chunduri, U., Ed., et al., "Usage of Non Shortest Path Forwarding (NSOF) IDs in IS-IS," draft-ct-isis-nspfidforsr-paths-01, Mar. 23, 2018, 16 pages.

Chunduri, U., et al., "Usage of Non Shortest Path Forwarding (NSPF) IDs in OSPF," draft-ctospfnspfid-for-sr-paths-00, Mar. 24, 2018, 14 pages.

Francois, P., et al., "Topology Independent Fast Reroute using Segment Routing," draft-francois-rtgwg-segment-routing-ti-lfa-04, Dec. 8, 2016, 12 pages.

Sivabalan, S., et al., "PCEP Extensions for Segment Routing," draft-ietf-pce-segment-routing-11, Nov. 20, 2017, 22 pages.

Mirsky, G., et al., "Bidirectional Forwarding Detection (BFD) in Segment Routing Networks Using MPLS Dataplane," draft-mirsky-spring-bfd-05, Mar. 1, 2018, 11 pages.

Atlas, A., Ed., et al., Basic Specification for IP Fast Reroute: Loop-Free Alternates, RFC 5286, Sep. 2008, 31 pages.

Bryant, S., et al., "Remote Loop-Free Alternate (LFA) Fast Reroute (FRR)," RFC 7490, Apr. 2015, 29 pages.

Atlas, A., et al., "An Architecture for IP/LDP Fast Reroute Using Maximally Redundant Trees (MRT-FRR)," RFC 7812, Jun. 2016, 44 pages.

Kumar, N., et al., "Label Switched Path (LSP) Ping/Traceroute for Segment Routing (SR) IGP-Prefix and IGP-Adjacency Segment Identifiers (SIDs) with MPLS Data Planes," RFC 8287, Dec. 2017, 25 pages.

Chunduri, U., "Preferred Path Routing (PPR) in IS-IS," draftchunduri-lsr-isis-preferred-path-routing-01, Jul. 2, 2018, 51 pages.

Chunduri, U., "Preferred Path Routing (PPR) in OSPF," draftchunduri-lsr-ospf-preferred-path-routing-01, July 2, 2018, 22 pages.

Alimi, R., Ed., "Application-Layer Traffic Optimization (ALTO) Protocol," RFC 7285, Sep. 2014, 91 pages.

Crabbe, E., "Path Computation Element Communication Protocol (PCEP) Extensions for PCE-Initiated LSP Setup in 4 a Stateful PCE Model," RFC 8281, Dec. 2017, 20 pages.

Filsfils, C., Ed., "Segment Routing Architecture," RFC 8402, Jul. 2018, 32 pages.

* cited by examiner

ADVANCED PREFERRED PATH ROUTE GRAPH FEATURES IN A NETWORK

CROSS-REFERENCE TO RELATED APPLICATIONS

The present application is a continuation of International Patent Application PCT/US2019/045980 filed Aug. 9, 2019 by Futurewei Technologies, Inc. and claims the benefit of U.S. Provisional Patent Application No. 62/719,338 filed Aug. 17, 2018 by Toerless Eckert, et al., and entitled "Advanced Preferred Path Routing (PPR) Graph Features," each of which is incorporated herein by reference as if reproduced in its entirety.

FIELD OF INVENTION

The present disclosure pertains to the field of preferred path routing. In particular, the present disclosure relates to establishing and provisioning preferred path route (PPR) graphs in a network, in which anycasting, quality of service (QoS) parameters, and backup PPR graphs can be implemented.

BACKGROUND

In a network implementing source routing, a controller that has knowledge of a complete topology of the underlying network can program an ingress node of the network with a custom path that certain traffic has to travel to reach a destination. This custom path may not necessarily be the shortest path between the ingress node and egress node. An ingress node in the network may use a separate flow classification technique (e.g., source and/or destination addresses or transport port numbers) to associate certain traffic flow with a custom path.

In a network implementing segment routing (SR), packets are steered through the network using segment identifiers (SIDs) that uniquely identify segments in the network. A segment may include one or more nodes, interfaces, and links between two nodes in the network. The SIDs are typically carried in the header of the packet.

Currently there are two data planes that use segment routing to provision custom paths in a network—Segment Routing (SR) Multi-Protocol Label Switching (MPLS) (SR-MPLS) and SR-Internet Protocol (IP) Version 6 (IPv6) (SR-IPv6). In SR-MPLS, each segment is encoded as a label, and an ordered list of segments are encoded as a stack of labels in the header of the packet. Similarly, in SR-IPv6, each segment is encoded as an IPv6 address within a segment routing header (SRH).

SUMMARY

A first aspect of the present disclosure relates to a method implemented by a network element (NE) in a network. The method comprises receiving, by the NE, preferred path route (PPR) information comprising a PPR identifier (PPR-ID) and a plurality of PPR-Path Description Elements (PPR-PDEs), wherein the PPR-ID identifies a PPR graph representing a plurality of PPRs between an ingress NE and an egress NE, wherein each of the PPR-PDEs describes an element on the PPR graph, and wherein a PPR-PDE describing the egress NE comprises a destination flag, an anycast PPR-ID, and an anycast group PPR-ID associated with the egress NE, updating, by the NE, a forwarding database to include a forwarding entry for the egress NE, wherein the forwarding entry includes the PPR-ID, the anycast PPR-ID, and the anycast group PPR-ID, and wherein the forwarding entry indicates a next element on the PPR graph by which to forward an anycast data packet comprising the anycast PPR-ID, and forwarding, by the NE, the anycast data packet to the next element on the PPR graph based on the forwarding entry.

Optionally, in a first implementation according to the second aspect, the NE is the ingress NE, wherein the method further comprises receiving, by the NE, the anycast data packet comprising the anycast PPR-ID, and replacing, by the NE, the anycast PPR-ID included in the anycast data packet with the anycast group PPR-ID based on the PPR-PDE describing the egress NE.

Optionally, in a second implementation according to the first aspect or any other implementation of the first aspect, NE is the egress NE, wherein the method further comprises receiving, by the NE, the anycast data packet comprising the anycast group PPR-ID, and replacing, by the NE, the anycast group PPR-ID included in the anycast data packet with the anycast PPR-ID based on the PPR-PDE describing the egress NE.

Optionally, in a third implementation according to the first aspect or any other implementation of the first aspect, the PPR information is carried in an advertisement comprising a PPR-ID header carrying the PPR-ID.

Optionally, in a fourth implementation according to the first aspect or any other implementation of the first aspect, the PPR information is received from a central entity of the network.

Optionally, in a fifth implementation according to the first aspect or any other implementation of the first aspect, the PPR graph comprises a plurality of branches, wherein each branch comprises a plurality of elements on a path between two NEs included in the PPR graph.

A second aspect of the present disclosure relates to a method implemented by a NE in a network. The method comprises receiving, by the NE, PPR information comprising a PPR-ID and a plurality of PPR-PDEs, wherein the PPR-ID identifies a PPR graph representing a plurality of PPRs between an ingress NE and an egress NE, wherein each of the PPR-PDEs describe an element on the PPR graph, and wherein the PPR-PDE describing the ingress NE comprises a source flag and a quality of service (QoS) attribute associated with a resource to be reserved along an outgoing element of the NE, updating, by the NE, a forwarding database to include a forwarding entry for the egress NE, wherein the forwarding entry includes the PPR-ID and the QoS attribute associated with the resource to be reserved along the outgoing element of the NE, and reserving, by the NE, the resource along the outgoing element of the NE in response to receiving the PPR information.

Optionally, in a first implementation according to the second aspect, wherein the method further comprises computing, by the NE, a sum of a plurality of QoS attributes for a plurality of previous source NEs on the PPR graph and the QoS attribute, wherein the resource is reserved along the outgoing element of the NE based on the sum.

Optionally, in a second implementation according to the second aspect or any other implementation of the second aspect, the PPR information further comprises a maximum QoS attribute associated with the PPR graph.

Optionally, in a third implementation according to the second aspect or any other implementation of the second aspect, the resource is reserved along the outgoing element of the NE based on the maximum QoS attribute when the sum is greater than the maximum QoS attribute.

Optionally, in a fourth implementation according to the second aspect or any other implementation of the second aspect, the QoS attribute is at least one of a bandwidth required to transmit the data packet along the PPR graph, a buffer size of a buffer at the NE, a burst size permitted to be transmitted along the outgoing element of the NE, a bounded latency permitted to occur at the NE, or a lifetime indicating a time period during which the resource is to be reserved on the outgoing element of the NE.

Optionally, in a fifth implementation according to the second aspect or any other implementation of the second aspect, the PPR information is received from a central entity of the network.

A third aspect of the present disclosure relates to a method implemented by a NE in a network. The method comprises receiving, by the NE, PPR information comprising a PPR-ID and a plurality of PPR-PDEs, wherein the PPR-ID identifies a PPR graph representing a plurality of PPRs between an ingress NE and an egress NE, and wherein each of the PPR-PDEs describe an element on the PPR graph, receiving, by the NE, backup PPR information describing at least two backup PPR graphs between the ingress NE and the egress NE in the network, wherein a PPR-PDE of the ingress NE includes a backup PPR flag indicating a backup PPR graph of the at least two backup PPR graphs along which to forward a data packet in response to a failure occurring at the ingress NE, updating, by the NE, a forwarding database to include a forwarding entry for the egress NE, wherein the forwarding entry comprises the PPR information and the backup PPR flag, and forwarding, by the NE, the data packet to a next element based on the backup PPR information and the backup PPR flag instead of the PPR information in response to the failure occurring at the ingress NE.

Optionally, in a first implementation according to the third aspect, a destination of the at least two backup PPR graphs is the egress NE.

Optionally, in a second implementation according to the third aspect or any other implementation of the third aspect, the backup PPR information for the at least two backup PPR graphs comprises a plurality of PPR-PDEs describing a plurality of backup elements included in each of the at least two backup PPR graphs.

Optionally, in a third implementation according to the third aspect or any other implementation of the third aspect, the backup PPR flag is a 1 bit field set to indicate the backup PPR graph of the at least two backup PPR graphs.

Optionally, in a fourth implementation according to the third aspect or any other implementation of the third aspect, the NE is the ingress NE, wherein forwarding the data packet to the next element based on the backup PPR information instead of the PPR information comprises determining, by the NE, that the next element on the PPR graph is unavailable, searching, by the NE, the forwarding database to determine the backup PPR graph along which to forward the data packet in response to the next element on the PPR graph being unavailable, replacing, by the NE, the PPR-ID included in the data packet with a backup PPR-ID identifying the backup PPR graph, and transmitting, by the NE, the data packet to a next element on the backup PPR graph based on the backup PPR information stored at the forwarding database.

Optionally, in a fifth implementation according to the third aspect or any other implementation of the third aspect, the PPR graph comprises a plurality of ingress NEs, wherein each of the plurality of PPR-PDEs for each of the plurality of ingress NEs includes a source flag.

Optionally, in a sixth implementation according to the third aspect or any other implementation of the third aspect, the NE is an intermediate NE on the backup PPR path, and wherein the method further comprises receiving, by the NE, the data packet including a backup PPR-ID identifying the backup PPR graph, and transmitting, by the NE, the data packet to a next element on the backup PPR graph based on the backup PPR information stored at the forwarding database.

Optionally, in a seventh implementation according to the third aspect or any other implementation of the third aspect, wherein the method further comprises forwarding, by the NE, the PPR information and backup PPR information to a plurality of other NEs in the network.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1A:
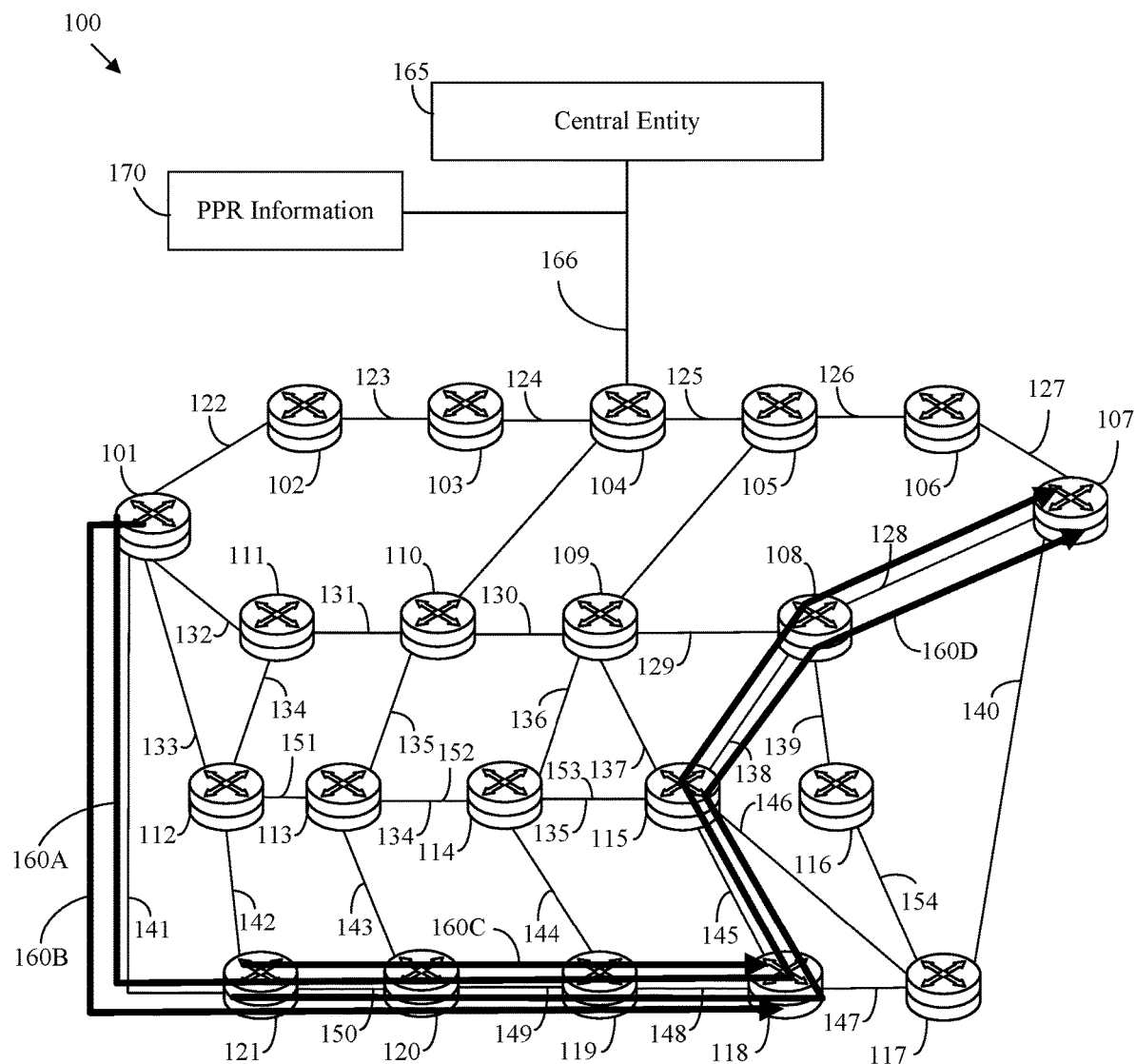
FIG. 1A is a diagram illustrating a network configured to implement preferred path routing.

FIG. 1A is a diagram illustrating a network 100 (also referred to herein as a "domain" or "subnetwork") configured to implement preferred path routing. The network 100 comprises a central entity 165 (also referred to herein as a "controller") and multiple network entities (NEs) 101-121. The NEs 101-121 are interconnected via links 122-154. The central entity 165 is connected to one of the NEs 104 via a central entity-to-domain link 166.

In an embodiment, the central entity 165 may be a network or domain controller that maintains a topology of the network 100 to craft paths (shortest paths, PPRs, and PPR graphs) between edge NEs 101-121 in the network 100, as will be further described below. In an embodiment, the central entity 165 is substantially similar to a Path Computation Element (PCE), which is further described in Internet Engineering Task Force (IETF) Request for Comments (RFC) 8281, entitled "Path Computation Element Communication Protocol (PCEP) Extensions for PCE-Initiated LSP Setup in a Stateful PCE Model," by E. Crabbe, dated December 2017, and which is hereby incorporated by reference in its entirety. In an embodiment, the central entity 165 may be substantially similar to a Software Defined Network Controller (SDNC), which is further described in the IETF RFC 8402 entitled "Segment Routing Architecture," by C. Filsfils, dated July 2018, and which is hereby incorporated by reference in its entirety. In an embodiment, the central entity 165 may be substantially similar to an Application Layer Traffic Optimization (ALTO) server, which is further described in the IETF RFC 7285, entitled "Application Layer Traffic Optimization (ALTO) Protocol," by R. Alimi, dated September 2014, and which is hereby incorporated by reference in its entirety.

In an embodiment, NEs 101-121 (also referred to herein as "nodes") may be a topological devices (or physical devices) such as a router, a bridge, a network switch, or a logical device configured to perform switching and routing using the preferred path routing mechanisms disclosed herein. In an embodiment, one or more of the NEs 101-121 may be non-topological NEs such as, for example, a function, context, service, or a virtual machine. A non-topological NE may be implemented by the NEs 101-121 or implemented by another device attached to the NEs 101-121.

In an embodiment, NEs 101-121 may be headend nodes or edge nodes positioned at an edge of the network 100. While NEs 101-121 are shown in FIG. 1A as headend nodes, it should be appreciated that NEs 101-121 may otherwise be an intermediate node or any other type of NE. Although only twenty one NEs 101-121 are shown in FIG. 1A, it should be appreciated that the network 100 shown in FIG. 1A may include any number of NEs. In an embodiment, the central entity 165 and NEs 101-121 are configured to implement various packet forwarding protocols, such as, but not limited to, Multi-Protocol Label Switching (MPLS), Segment Routing-MPLS (SR-MPLS), Internet Protocol (IP) Version 4 (IPv4), IP Version 6 (IPv6), Next Generation Explicit Routing (NGER), or any future packet forwarding protocol.

The links 122-154 may be wired links, wireless links, or interfaces interconnecting the NEs 101-121 together. Similarly, the central entity-to-domain link 166 is a wired link, wireless link, or interfaces interconnecting at least one of the NEs 101-121 to the central entity 165.

In operation, the central entity 165 is configured to determine one or more shortest paths between two edge NEs 101-121 in the network 100 and one or more PPRs 160A-D between different edge NEs 101-121 in the network 100. A shortest path refers to a path between two NEs 101-121 that is determined based on a metric, such as, for example, a cost or weight associated with each link on the path, a number of NEs on the path, a number of links on the path, etc. In an embodiment, a shortest path may be computed for a destination using a Dijkstra's Shortest Path First (SPF) algorithm.

A PPR 160A-D (also referred to herein as a "Non-Shortest Path" (NSP)) refers to a custom path or any other path that is determined based on an application or server request for a path between an ingress NE 101-121 and an egress NE 101-121 (or between a source and destination). In an embodiment, the PPR 160A-D deviates from the shortest path. However, the PPR 160A-D may also be the same as the shortest path in some circumstances. The PPR 160A-D includes a sequential ordering of elements 121-154 (e.g., NEs 101-121 and/or links 122-154) along a path in the network 100.

In an embodiment, the central entity 165 determines the PPRs 160A-D based on a network topology of network 100, which is maintained at the central entity 165. In this embodiment, the central entity 165 generates PPR information 170, describing each of the PPRs 160A-D, and sends the PPR information 170 to an NE 104 via the central entity-to-domain link 166.

As will be further described below, the PPR information 170 may include details regarding each of the PPRs 160A-D, such as, for example, a PPR-identifier (PPR-ID) of each PPR 160A-D, attributes associated with resources to be reserved on each PPR 160A-D, and multiple PPR-path description elements (PPR-PDEs) describing one or more elements on each PPR 160A-D. In this embodiment, NE 104 floods the PPR information 170 to the remaining NEs 101-103 and 105-121 in the network 100 using the underlying Interior Gateway Protocol (IGP) of the network 100. For example, NE 104 transmits the PPR information 170 to neighboring NEs 103 and 105. NE 103 forwards the PPR information 170 to neighboring NE 102, and NE 105 forwards the PPR information 170 to neighboring NE 106. In this way, the remaining NEs 101-103 and 105-121 continue to forward the PPR information 170 to all the remaining NEs 101-103 and 105-121 in the network 100. The IGP implemented by the network 100 may be Open Shortest Path First (OSPF) Version 2 (OSPFv2), OSPF Version 3 (OSPFv3), Intermediate System—Intermediate System (IS-IS), or direct SDN.

In another embodiment, an operator or administrator of the network 100 may determine the PPRs 160A-D and send the PPR information 170 describing the PPRs 160A-D to one of the NEs 101-121 in the network 100. The PPR information 170 may then be flooded to all the remaining NEs 101-121 in the network 100.

After receiving the PPR information 170, each of the NEs 101-121 is configured to determine whether the respective NE 101-121 is identified in the PPR information 170 describing one or more of the PPRs 160A-D. If so, then the respective NE 101-121 updates the local forwarding database by adding a forwarding entry defining a next hop for a particular destination or egress NE identified by the PPR information 170. If not, then the respective NE 101-121 ignores the PPR information 170.

In a network 100 implementing preferred path routing, a separate PPR 160A-D is determined and provisioned for each ingress and egress NE 101-121 pair. As shown by FIG. 1A, PPR 160A is a path provisioned between ingress NE 101 and egress NE 107. PPR 160A includes the following elements: ingress NE 101, link 141, NE 121, link 150, NE 120, link 149, NE 119, link 148, NE 118, link 145, NE 115, link 138, NE 108, link 128, and egress NE 107. PPR 160B is a path provisioned between ingress NE 101 and egress NE 118. PPR 160B includes the following elements: ingress NE 101, link 141, NE 121, link 150, NE 120, link 149, NE 119, link 148, and NE 118. PPR 160C is a path provisioned between ingress NE 121 and egress NE 118. PPR 160C includes the following elements: ingress NE 121, link 150, NE 120, link 149, NE 119, link 148, and NE 118. PPR 160D is a path provisioned between ingress NE 121 and egress NE 107. PPR 160D includes the following elements: ingress NE 121, link 150, NE 120, link 149, NE 119, link 148, NE 118, link 145, NE 115, link 138, NE 108, link 128, and egress NE 107.

In this case, the central entity 165 or an administrator of the network 100 generates the PPR information 170 to include details regarding each of PPRs 160A-D and each of the elements on each of the PPRs 160A-D. For example, a separate PPR-ID is determined for each of the PPRs 160A-D, and a separate PPR-PDE is created for one or more of the elements on each of the PPRs 160A-D. This PPR information 170 is flooded through the network 100 using the underlying IGP of the network such that one more of NEs 101-121 in network 100 stores the PPR information 170.

Therefore, to provision PPRs 160A-D in network 100, PPR information 170 for each of the PPRs 160A-D has to be created, flooded through the network 100, and stored at one or more of the NEs 101-121. This creates a scalability issue across the network 100, in that the amount of PPR information 170 that has to be created, forwarded, and stored is extensive when there are a large number of PPRs 160A-D to be provisioned in the network 100.

In various embodiments, PPR graphs represent a plurality of PPRs 160A-D between one or more ingress NEs 101-121 and one or more egress NEs 101-121 in the network 100. Instead of creating PPR information 170 for each PPR 160A-D in a network 100, the PPR information 170 describes PPR graphs, as disclosed herein. The PPR graphs include flags or bits to indicate whether an NE 101-121 is an ingress NE 101-121 or an egress NE 101-121. In this way, the amount of PPR information 170 that has to be created, forwarded, and stored across the network 100 is dramatically decreased. By using a single PPR graph instead of multiple PPRs 160A-D, paths may be provisioned in a more resource efficient manner that saves computing resources and network resources.

Figure 1B:
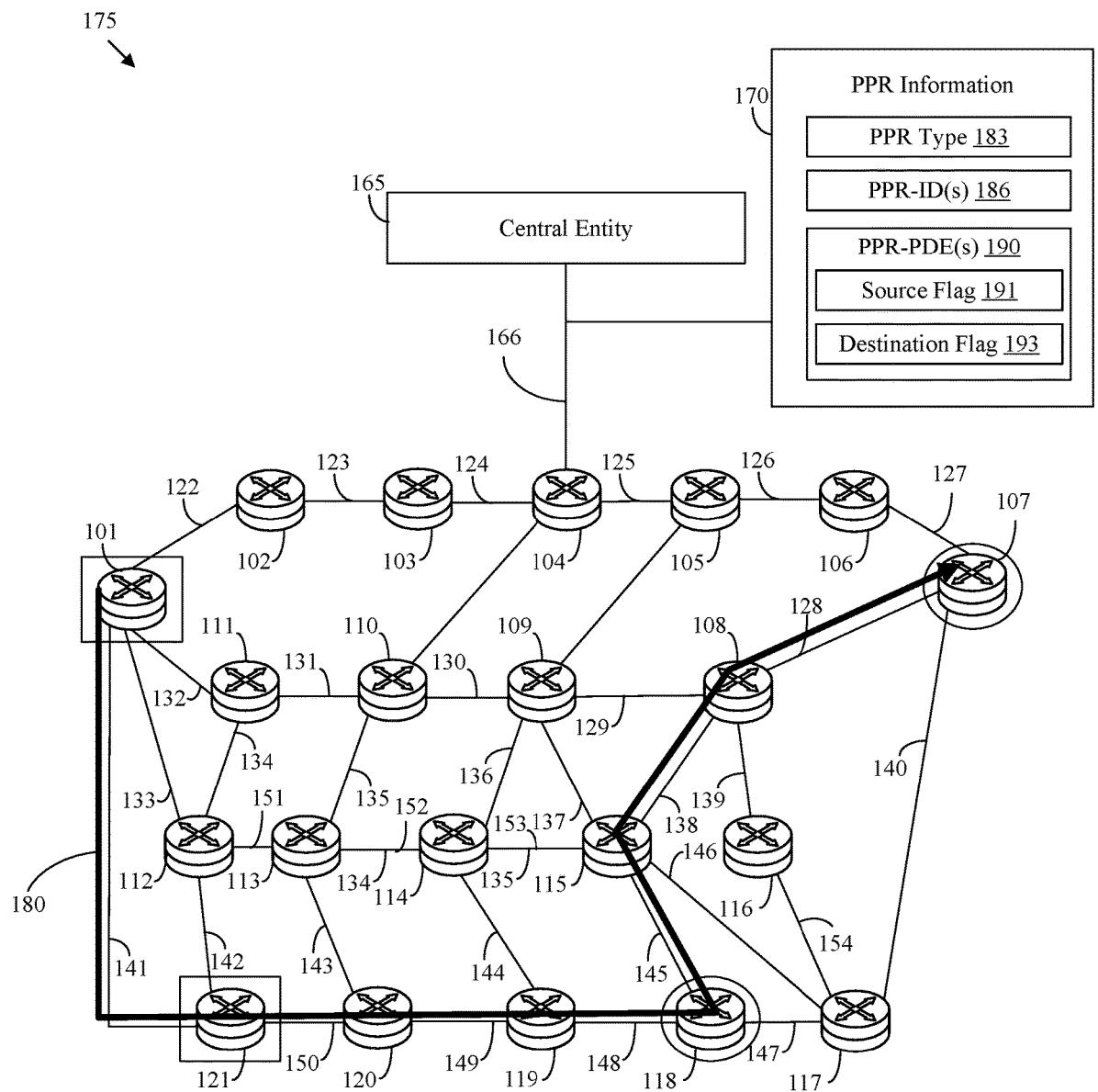
FIG. 1B is a diagram illustrating a network configured to implement preferred path routing and PPR graphs according to various embodiments of the disclosure.

FIG. 1B is a diagram illustrating a network 175 configured to implement preferred path routing and PPR graphs 180 according to various embodiments of the disclosure. Network 175 is similar to network 100, except that network 175 is configured to provision a single PPR graph 180, instead of multiple PPRs 160A-D. In an embodiment, a PPR graph 180 represents multiple PPRs 160A-D between one or more ingress NEs 101-121 (also referred to herein as "sources") and one or more egress NEs 101-121 (also referred to herein as "destinations").

As shown by FIG. 1B, the PPR graph 180 includes the following elements: NE 101, link 141, NE 121, link 150, NE 120, link 149, NE 119, link 148, NE 118, link 145, NE 115, link 138, NE 108, link 128, and NE 107. PPR graph 180 includes two ingress NEs 101 and 121 and two egress NEs 118 and 108. The ingress NEs 101 and 121 are represented in FIG. 1B with rectangles around NEs 101 and 121, and the egress NEs 118 and 107 are represented in FIG. 1B with circles around NEs 118 and 107.

In an embodiment, the PPR graph 180 represents multiple possible paths between the ingress NEs 101 and 121 and the egress NEs 119 and 108. For example, as shown in FIG. 1B, PPR graph 180 includes all of the elements from PPR 160A (FIG. 1A): ingress NE 101, link 141, NE 121, link 150, NE 120, link 149, NE 119, link 148, NE 118, link 145, NE 115, link 138, NE 108, link 128, and egress NE 107. PPR graph 180 also includes all of the elements from PPR 160B (FIG. 1A): ingress NE 101, link 141, NE 121, link 150, NE 120, link 149, NE 119, link 148, and NE 118. Similarly, PPR graph 180 includes all of the elements from PPR 160C (FIG. 1A): ingress NE 121, link 150, NE 120, link 149, NE 119, link 148, and NE 118. Finally, PPR graph 180 includes all of the elements from PPR 160D (FIG. 1A): ingress NE 121, link 150, NE 120, link 149, NE 119, link 148, NE 118, link 145, NE 115, link 138, NE 108, link 128, and egress NE 107. In this embodiment, the PPR graph 180 includes a PPR 160A between ingress NE 101 and egress NE 107, a PPR 160B between ingress NE 101 and egress NE 118, a PPR 160C between ingress NE 121 and egress NE 118, and a PPR 160D between ingress NE 121 and egress NE 107. Therefore, in various embodiments, a PPR graph 180 includes a plurality of different PPRs 160A-D, having different ingress NEs 101 and 121 and different egress NEs 118 and 107.

In an embodiment, the central entity 165 or a network administrator determines the PPR graph 180 based on a network topology of network 175 maintained at the central entity 165 and based on a network resource to be reserved for the PPR graph 180. In an embodiment, the central entity 165 or the network administrator generates PPR information 170 describing the PPR graph 180 and sends the PPR information 170 to a headend NE 104 in network 175 via central entity-to-domain link 166.

As shown by FIG. 1B, the PPR information 170 includes a PPR type 183, one or more PPR-IDs 186, and one or more PPR-PDEs 190. The PPR type 183 indicates a type of PPR graph 180. The different types of PPR graphs 180 will be further described below with reference to FIGS. 4-10. The one or more PPR-IDs 186 includes information identifying various paths within the PPR graph 180. In an embodiment, each of the PPR-IDs 186 includes an address, label, or identifier of each egress NE 118 and 107 included in the PPR graph 180.

The PPR-PDEs 190 include information identifying one or more elements (e.g., NE 101, link 141, NE 121, link 150, NE 120, link 149, NE 119, link 148, NE 118, link 145, NE 115, link 138, NE 108, link 128, and NE 107) on the PPR graph 180. In an embodiment, each of PPR-PDEs 190 includes a label, address, or identifier of one or more of the elements 101-154 (e.g., NEs 101-121 and links 122-154) on the PPR graph 180. In an embodiment, each of the PPR-PDEs 190 includes several flags, such as a source flag 191 and a destination flag 193. The source flag 191 may be a bit that, when set, indicates that the element 101-154 identified by the PPR-PDE 190 is an ingress NE 101 or 121 on the PPR graph 180. The destination flag 193 is also a bit that, when set, indicates that the element 101-154 identified by the PPR-PDE 190 is an egress NE 118 or 107.

According to various embodiments, transmitting the PPR information 170 describing a single PPR graph 180, which includes all four PPRs 160A-D, instead of separately transmitting PPR information 170 describing multiple PPRs 160A-D, is a more efficient and effective manner of communicating data regarding multiple different PPRs 160A-D in a network 175. In addition, the amount of data that each of the NEs 101-121 processes and stores is reduced due to the consolidated nature of the PPR information 170 describing multiple PPRs 160A-D. Therefore, the use of PPR graphs 180 enables NEs 101-121 in a network 175 to be more efficiently programmed to forward traffic according to various the PPR graphs 180.

Figure 2:
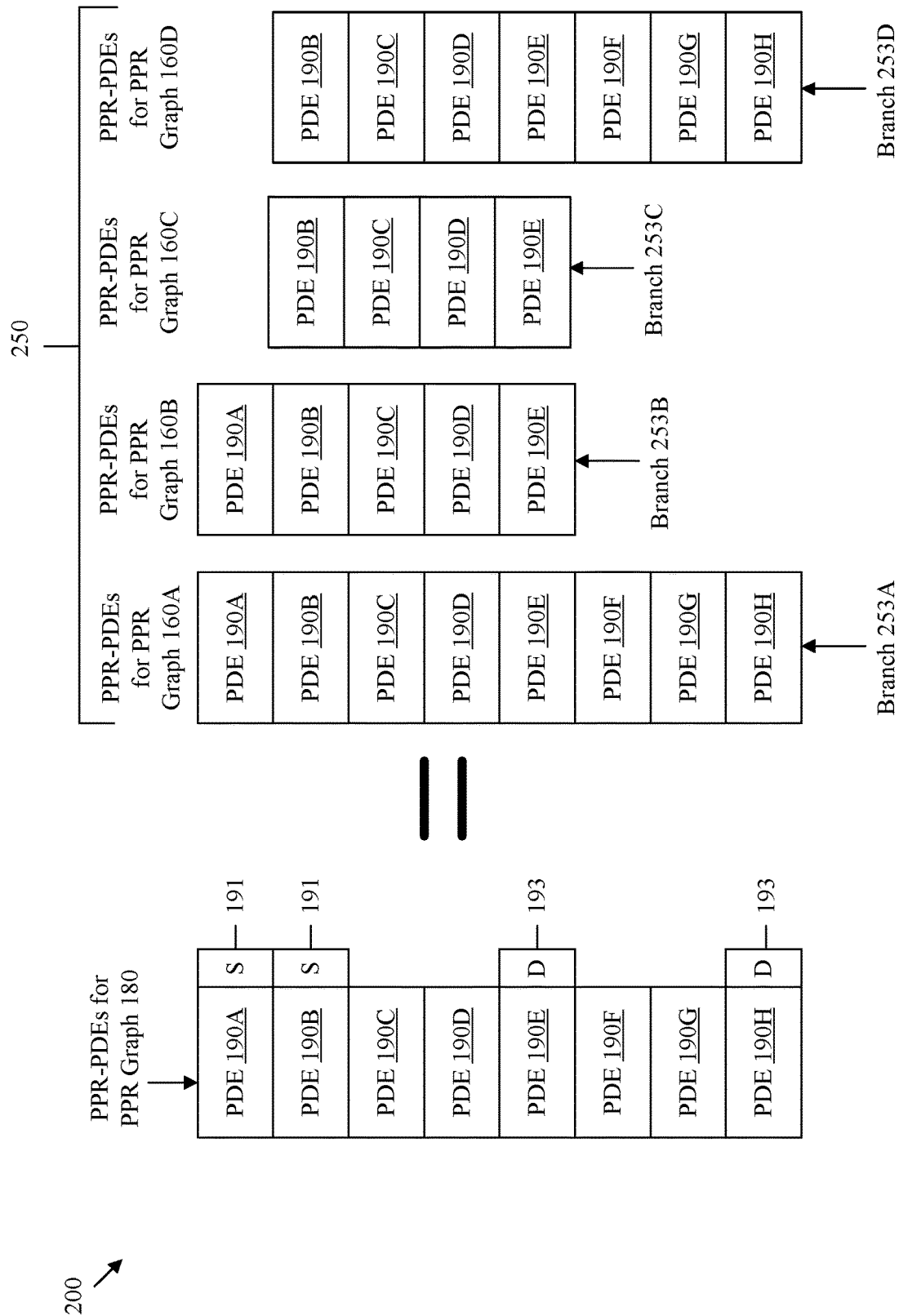
FIG. 2 is a diagram illustrating the PPR path description elements (PPR-PDEs) describing elements on the PPR graph of FIG. 1B according to various embodiments of the disclosure.

FIG. 2 is a diagram 200 illustrating the PPR-PDEs 190A-H describing elements on the PPR graph 180 of FIG. 1B, which is included in the PPR information 170, according to various embodiments of the disclosure. In an embodiment, PPR-PDEs 190A-H describe one or more of the elements (e.g., NE 101, link 141, NE 121, link 150, NE 120, link 149, NE 119, link 148, NE 118, link 145, NE 115, link 138, NE 108, link 128, and NE 107) on the PPR graph 180.

In the example shown in FIG. 2, PPR-PDE 190A includes details regarding NE 101, such as a label, address, or identifier of NE 101. PPR PDE 190A also includes the source flag 191 set to indicate that NE 101 is an ingress NE 101 of the PPR graph 180. An ingress NE 101 is configured to be a source of traffic, or receive traffic from sources external to the network 175, and forward the traffic through the network 175 using the PPR graph 180. PPR-PDE 190B includes details regarding NE 121, such as a label, address, or identifier of NE 121. PPR-PDE 190B also includes the source flag 191 set to indicate that NE 121 is also an ingress NE 121 of the PPR graph 180.

PPR-PDE 190C includes details regarding NE 120, and PPR-PDE 190D includes details regarding NE 119. PPR-PDE 190E includes details regarding NE 118, and includes the destination flag 193, which is set to indicate that NE 118 is an egress NE 118 of the PPR graph 180. This means that NE 118 is a destination on the PPR graph 180 and is configured to forward traffic outside of the network 175, to another network, or to another entity. PPR-PDE 190F includes details regarding NE 115, and PPR-PDE 190G includes details regarding NE 108. PPR-PDE 190H includes details regarding NE 107, and includes the destination flag 193, which again means that the egress NE 107 is a destination on the PPR graph.

Information 250 shown to the right of diagram 200 shows the PPR-PDEs 190A-H for the four different PPRs 160A-D (also referred to herein as "branches 253A-D") shown in FIG. 1A, each of which would have had to be forwarded through the network 100, and some of which would have had to be locally stored at one or more NEs 101-121. However, the PPR-PDEs 190A-H including the source flags 191 and destination flags 193 essentially include all of the information 250 shown to the right of diagram 200, in a much more compact and efficient data structure. Therefore, data that is transmitted through the network 175 to provision PPRs is reduced and the amount of computing resources needed to process the data is also reduced.

Figure 3:
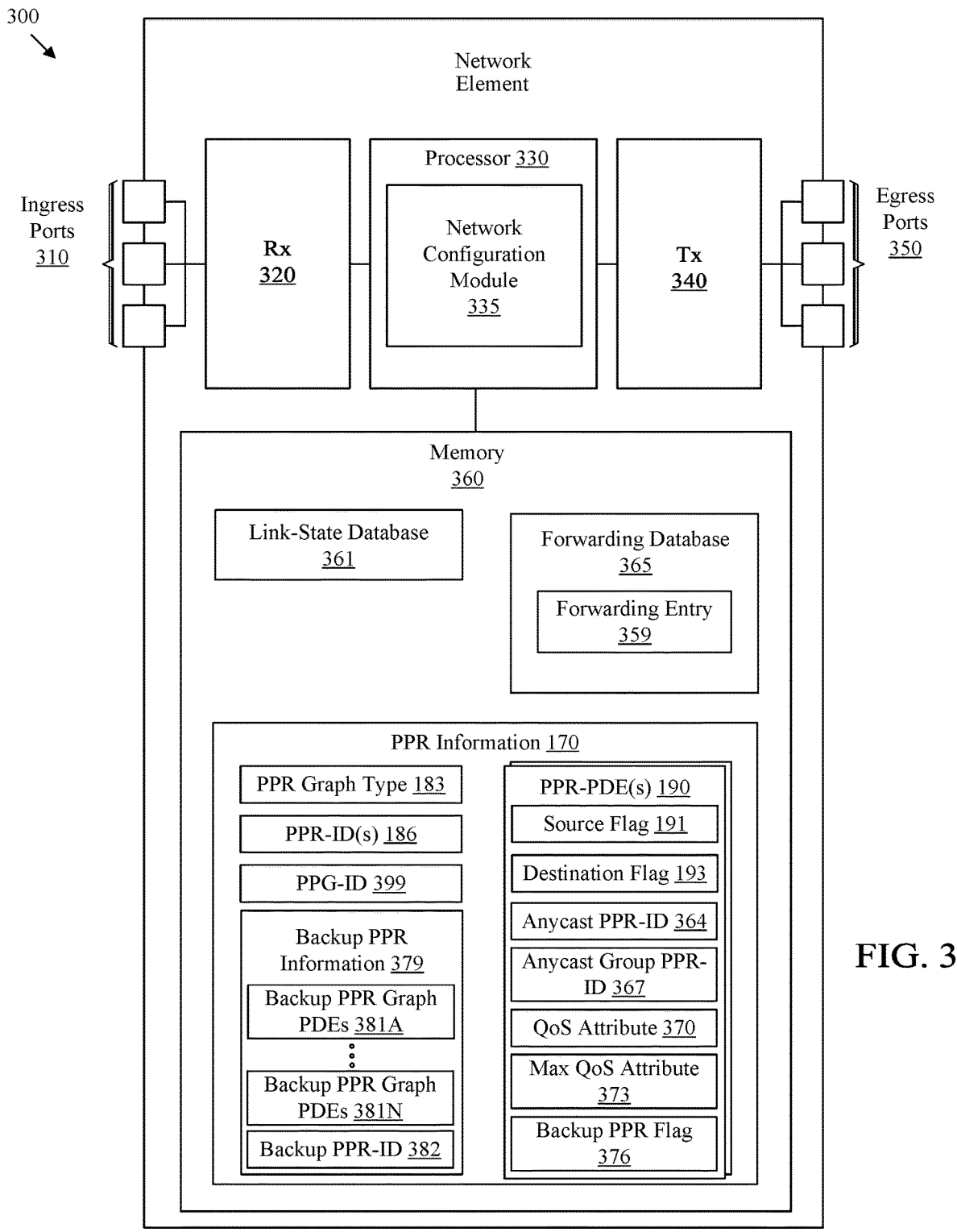
FIG. 3 is an embodiment of an NE in the network configured to implement preferred path routing, PPR graphs, and the advanced PPR graph features according to various embodiments of the disclosure.

FIG. 3 is a diagram of an embodiment of an NE 300 in a network such as networks 100 and 175. NE 300 may be implemented as the central entity 165 or the NEs 101-121. The NE 300 may be configured to implement and/or support the routing and PPR graph 180 provisioning mechanisms described herein. The NE 300 may be implemented in a single node or the functionality of NE 300 may be implemented in a plurality of nodes. One skilled in the art will recognize that the term NE encompasses a broad range of devices of which NE 300 is merely an example. While NE 300 is described as a physical device, such as a router or gateway, the NE 300 may also be a virtual device implemented as a router or gateway running on a server or a generic routing hardware (whitebox).

The NE 300 is included for purposes of clarity of discussion, but is in no way meant to limit the application of the present disclosure to a particular NE embodiment or class of NE embodiments. At least some of the features and/or methods described in the disclosure may be implemented in a network apparatus or module such as a NE 300. For instance, the features and/or methods in the disclosure may be implemented using hardware, firmware, and/or software installed to run on hardware. As shown in FIG. 3, the NE 300 comprises one or more ingress ports 310 and a receiver unit (Rx) 320 for receiving data, at least one processor, logic unit, or central processing unit (CPU) 330 to process the data, transmitter unit (Tx) 340 and one or more egress ports 350 for transmitting the data, and a memory 360 for storing the data.

The processor 330 may comprise one or more multi-core processors and be coupled to a memory 360, which may function as data stores, buffers, etc. The processor 330 may be implemented as a general processor or may be part of one or more application specific integrated circuits (ASICs) and/or digital signal processors (DSPs). The processor 330 may comprise a network configuration module 335, which may perform processing functions of the central entity 165 or the NEs 101-121. The network configuration module 335 may also be configured to perform the steps of methods 900, 1100, and 1300, and/or any other method discussed herein. As such, the inclusion of the network configuration module 335 and associated methods and systems provide improvements to the functionality of the NE 300. Further, the network configuration module 335 effects a transformation of a particular article (e.g., the network) to a different state. In an alternative embodiment, network configuration module 335 may be implemented as instructions stored in the memory 360, which may be executed by the processor 330.

The memory 360 may comprise a cache for temporarily storing content, e.g., a random-access memory (RAM). Additionally, the memory 360 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory 360 may be configured to store the PPR information 170, which includes the PPR type 183, PPR-IDs 186, and PPR-PDEs 190A-H (hereinafter referred to as "PPR-PDE 190"), a PPR graph identifier (PPG-ID) 399, and/or backup PPR information 379. The PPG-ID 399 may be a label, address, or identifier uniquely identifying the PPR graph 180. Each PPR-PDE 190 may include, amongst other information, a source flag 191, a destination flag 193, an anycast PPR-ID 364, an anycast group PPR-ID 367, a QoS attribute 370, a maximum QoS attribute 373, and/or a backup PPR flag 376, and details of each of these will be further described below. The backup PPR information 379 includes one or more backup PPR graph PDEs 381A-N and backup PPR-IDs 382. The backup PPR-IDs 382 are similar to the PPR-IDs 186, except that the backup PPR-IDs 382 identify one or more backup PPR graphs. The backup PPR graph PDEs 381A-N are similar to the PPR-PDEs 190, except that the backup PPR graph PDEs 381A-N describe elements on one or more backup PPR graphs. The anycast PPR-ID 364, anycast group PPR-ID 367, QoS attribute 370, maximum QoS attribute 373, backup PPR flag 376, backup PPR-ID 382, and backup PPR graph PDEs 381A-N will be further described below. In addition, the memory 360 is configured to store a forwarding database 365 and a link state database 361. In an embodiment, the forwarding database 365 stores forwarding entries 359 describing forwarding rules for how a particular NE 300 (e.g., NE 101-121 of FIGS. 1-2) should forward a data packet that includes a PPR-ID 186 and/or a destination address. The link state database 361 stores entries describing the reservation of resources along links within the network.

It is understood that by programming and/or loading executable instructions onto the NE 300, at least one of the processor 330 and/or memory 360 are changed, transforming the NE 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC in a particular machine or apparatus, likewise a computer that has been programmed and/or loaded with executable instructions may be viewed as a particular machine or apparatus. In some embodiments, the NE 300 may be configured to implement OSPFv2, OSPFv3, IS-IS, or direct SDN controller based on network implementations.

Disclosed herein are embodiments directed to advanced PPR graph features, which refer to enhanced networking features that can be provided using the PPR graphs 180 described above. In a first embodiment, the PPR graphs 180 are used to anycast addressing and routing methodologies (also referred to herein as "anycasting"). In a second embodiment, the PPR graphs 180 are used to enforce QoS attributes 370 at each of the ingress NEs in a PPR graph 180. In a third embodiment, at least two backup PPR graphs may be set up for a PPR graph 180, and each ingress NE in the PPR graph 180 may be assigned to one of the at least two backup PPR graphs using a backup PPR flag 376.

In the first embodiment in which PPR graphs 180 implement anycasting (also referred to herein as an "anycast PPR graph"), an anycast PPR-ID 364, which may be a label, address, or identifier, identifies two or more endpoint destinations or egress NEs in a network. In this embodiment, the anycast PPR graph includes multiple paths (e.g., PPRs 160) from each of the sources (e.g., ingress NEs) in the PPR graph 180 to each of the destinations (e.g., egress NEs) in the PPR graph 180. In this embodiment, the PPR information 170 for the anycast PPR graph includes a PPR graph type 183 that indicates that the PPR information 170 includes anycast addresses. In this embodiment, the PPR information 170 for the anycast PPR graph also includes the anycast PPR-ID 364 representing multiple destinations included within an anycast group, an anycast group PPR-ID 367 uniquely representing each of the destinations within the anycast group, and the PPR-ID 186 of the anycast PPR graph. FIGS. 4-9 provide additional details and examples regarding this embodiment of the disclosure directed to anycast PPR graphs.

Figure 10:
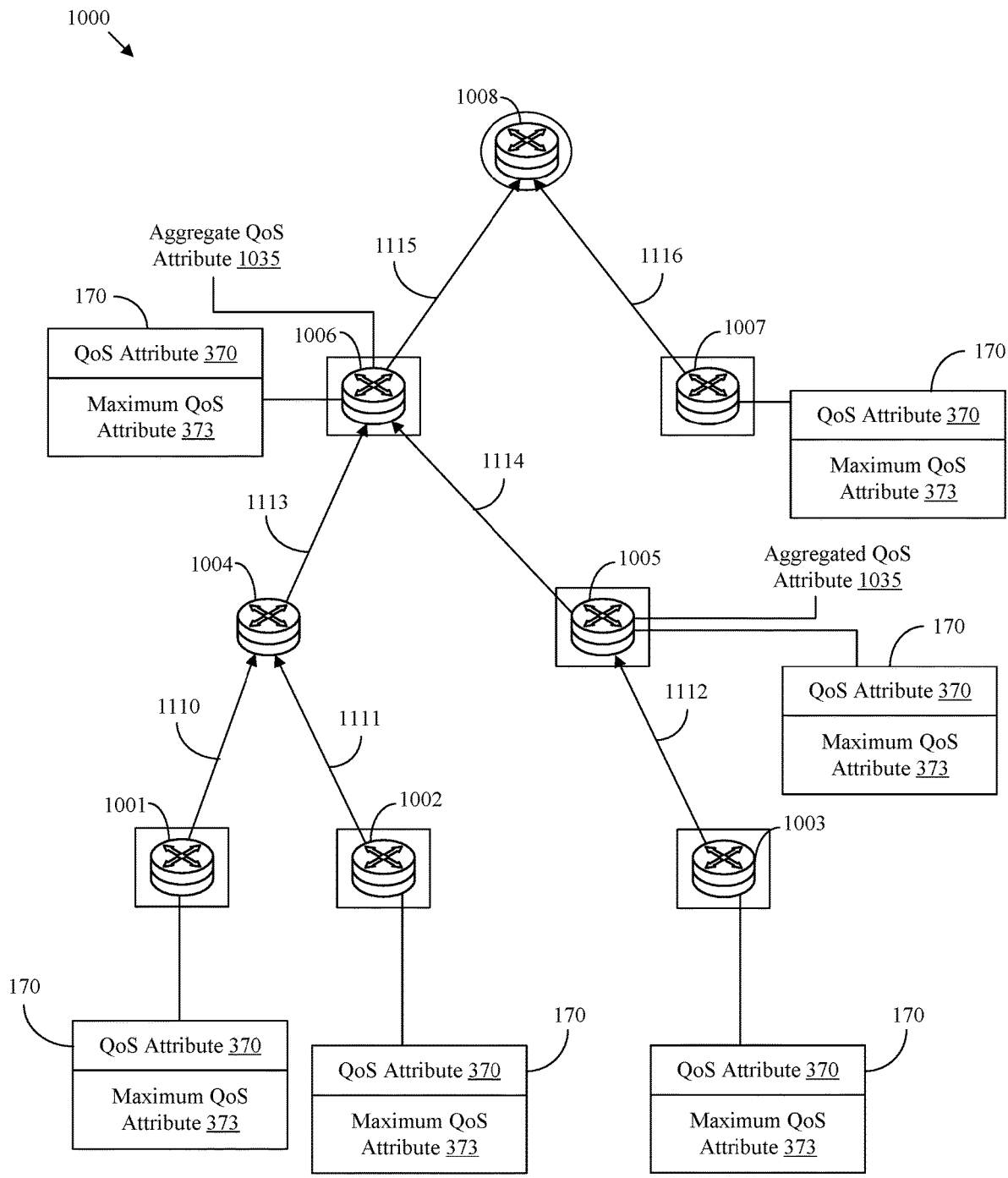
FIG. 10 is a diagram illustrating a PPR graph configured to enforce QoS parameters according to various embodiments of the disclosure.
Figure 11:
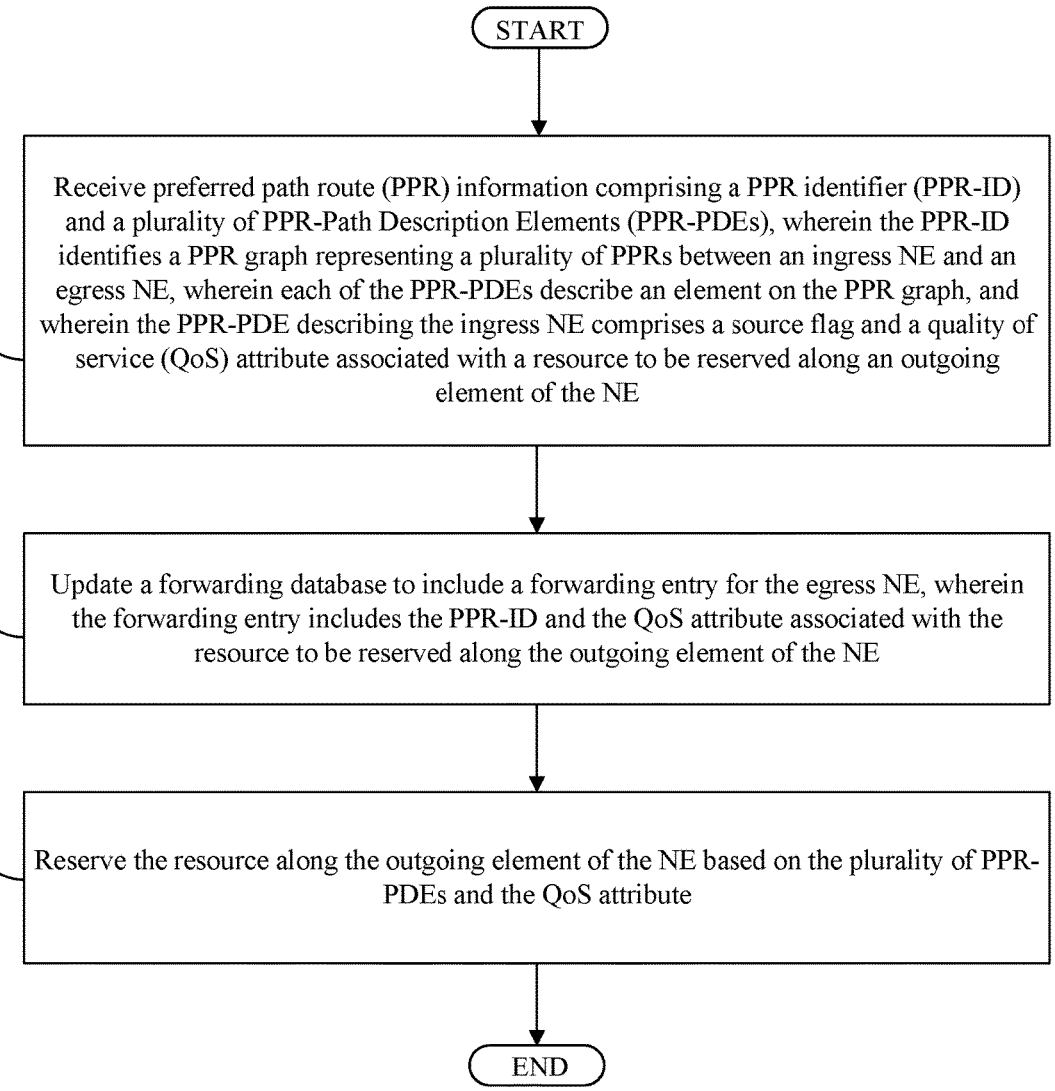
FIG. 11 is a flowchart of a method of enforcing QoS attributes in PPR graphs according to various embodiments of the disclosure.

In the second embodiment in which QoS attributes 370 are enforced in PPR graphs 180, each ingress NE in a PPR graph 180 is associated with a QoS attribute 370. In this embodiment, a PPR-PDE 190 for each ingress NE on a PPR graph 180 includes a QoS attribute 370 for the respective ingress NE. In an embodiment, the PPR information 170 for a PPR graph 180 also includes a maximum QoS attribute 373 for the PPR graph 180. Each ingress NE on a PPR graph 180 calculates a sum of the QoS attributes 370 for each downstream ingress NE on the PPR graph 180 and compares the sum of the QoS attributes 370 to the maximum QoS attribute 373 for the PPR graph 180. When the sum of the QoS attributes 370 for each downstream ingress NE on the PPR graph 180 is less than the maximum QoS attribute 373 for the PPR graph 180, the ingress NE allocates the QoS attribute 370 along the PPR graph 180. For example, the ingress NE reserves a resource along an outgoing element (e.g., interface) of the ingress NE toward the egress NE based on the QoS attribute 370. When the sum of QoS attributes 370 for each downstream ingress NE on the PPR graph 180 is greater than the maximum QoS attribute 373 for the PPR graph 180, the ingress NE allocates the maximum QoS attribute 373 along the PPR graph 180. For example, the ingress NE reserves a resource along an outgoing element of the ingress NE toward the egress NE based on the maximum QoS attribute 373. FIGS. 10-11 provide additional details and examples regarding this embodiment of the disclosure directed to QoS enforcement.

In the third embodiment in which backup PPR graphs are set up for the PPR graph 180, NEs in the PPR graph 180 may implement fast rerouting mechanisms by encoding backup PPR flags 376 in the PPR information 170. A backup PPR flag 376 indicates a particular backup PPR graph for each ingress NE in the PPR graph 180. In an embodiment, within the PPR information 170, each PPR-PDE 190 for an ingress NE includes a backup PPR flag 376. In an embodiment, the PPR information 170 includes backup PPR information 379, which includes backup PPR-IDs 382 and backup PPR graph PDEs 381A-N for each backup PPR graph that can be used when an element adjacent to an ingress NE fails or is no longer available. In this embodiment, the backup PPR flag 376 indicates the particular backup PPR graph to use when an element adjacent to a particular ingress NE fails or is no longer available to transmit traffic. FIGS. 12-13 provide additional details and examples regarding this embodiment of the disclosure directed to backup PPR graphs.

Figure 4:
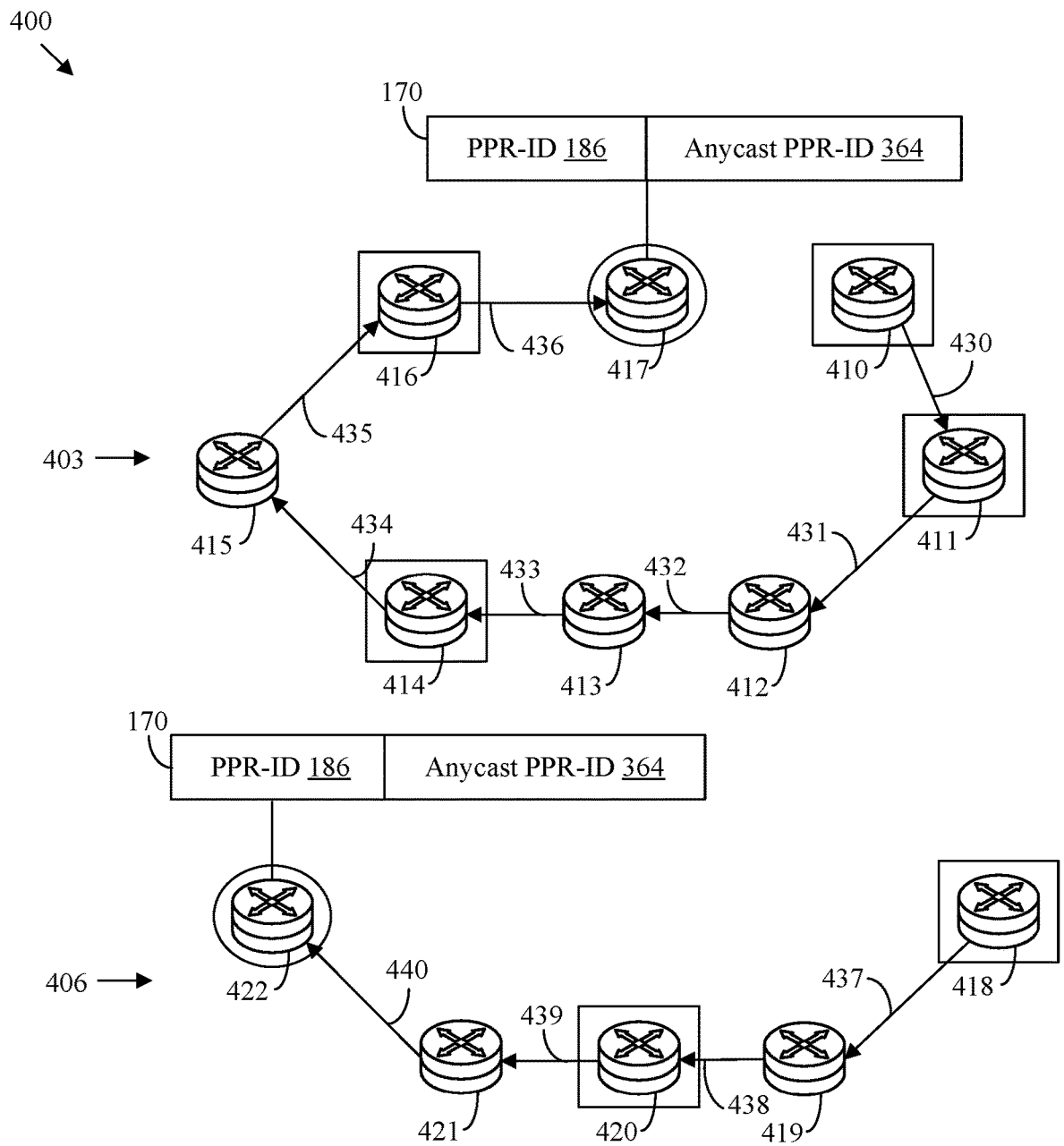
FIG. 4 is a diagram illustrating an anycast PPR graph configured to implement anycast addressing and routing methodologies according to various embodiments of the disclosure.

FIG. 4 is a diagram illustrating an anycast PPR graph 400 configured to implement anycast addressing and routing methodologies according to various embodiments of the disclosure. In an embodiment, the anycast PPR graph 400 is similar to PPR graph 180, in that the anycast PPR graph 400 includes at least one path between at least one an ingress NE and an egress NE. However, in the embodiment of the anycast PPR graph 400 shown in FIG. 4, the anycast PPR graph 400 includes at least two disjoint trees with non-overlapping NEs, in which each disjoint tree has a single separate egress NE (e.g., destination) and multiple ingress NEs (e.g., sources). The anycast PPR graph 400 includes two PPR trees 403 and 406 that are separate and disjoint (e.g., PPR tree 403 and PPR tree 406 do not share any elements (e.g., NEs or links)). In FIG. 4, the PPR tree 403 includes NEs 410-417, and PPR tree 406 includes NEs 418 to 422, each of which are similar to NEs 101-121 of FIGS. 1A-B. NEs 410-417 of PPR tree 403 are interconnected by links 430-436, which are similar to links 122-154 of FIGS. 1A-B. Similarly, NEs 418-422 of PPR tree 406 are each are similar to NEs 101-121 of FIGS. 1A-B and are interconnected by links 437-440, which are also similar to links 122-154 of FIGS. 1A-B.

PPR trees 403 and 406 each include multiple ingress NEs (also referred to as source NEs or sources) and a single egress NE (also referred to as a destination NE or destination). PPR trees 403 and 406 represent one or more paths from each of the ingress NEs to the single egress NE. As shown by FIG. 4, PPR tree 403 includes multiple ingress NEs 410, 411, 414, and 416, but only a single egress NE 417. The ingress NEs 410, 411, 414, and 416 are represented in FIG. 4 with rectangles, while the single egress NE 417 is represented in FIG. 4 with a circle. Similarly, PPR tree 406 includes multiple ingress NEs 418 and 420, but only a single egress NE 422. The ingress NEs 418 and 420 are represented in FIG. 4 with circles, while the single egress NE 422 is represented in FIG. 4 with a rectangle.

The anycast PPR graph 400 is identified by the PPR-ID 186, which represents the entire anycast PPR graph 400, including both PPR trees 403 and 406. In an embodiment, the PPR-ID 186 may be a label, address, or identifier of one of the egress NEs 417 or 422. The egress NEs 417 and 422 within the anycast PPR graph 400 are assigned to an anycast group, which refers to a group of one or more egress NEs 417 having a same anycast PPR-ID 364. In this case, each of egress NEs 417 and 422 is associated an anycast PPR-ID 364 representing the anycast group. The anycast PPR-ID 364 is a unicast address, label, or identifier, which may be encoded according to any type of transmission protocol (e.g., IPv4, IPv6, MPLS, etc.).

In the control plane, the central entity 165 determines or obtains the anycast PPR-ID 364 for each of the egress NEs 417 and 422 within the anycast PPR graph 400. The central entity 165 then generates the PPR information 170 describing the anycast PPR graph 400, including the PPR-ID 186 representing the anycast PPR graph 400 and the anycast PPR-ID 364 for each of the egress NEs 417 and 422 within the anycast PPR graph 400. In an embodiment, the central entity 165 may send the PPR information 170 to at least one of the NEs 410-422 in a network, such that the PPR information 170 is flooded through the entire network, as described above with reference to FIGS. 1A-B. After receiving the PPR information 170, each of the NEs 410-422 identified in the PPR-PDEs 190 of the PPR information 170 updates the forwarding database 365 to include a forwarding entry 359. The forwarding entry 359 may include the PPR-ID 186 of the anycast PPR graph 400, the anycast PPR-ID 364 for both the egress NEs 417 and 422, and/or a next element (e.g., next hop) on the anycast PPR graph 400 toward one of the egress NEs 417 and 422.

In the data plane, one of the ingress NEs 410, 411, 414, or 416 on the anycast PPR graph 400 receives a data packet including an anycast PPR-ID 364 as the destination of a data packet. For example, when the ingress NE 414 receives a data packet including the anycast PPR-ID 364, then the ingress NE 414 searches the forwarding database 365 for the forwarding entry 359 corresponding to the anycast PPR-ID 364 and the ingress NE 414. The forwarding entry 359 indicates that the nearest destination represented by the anycast PPR-ID 364 is the egress NE 417. The ingress NE 414 then identifies the next element (e.g., link 434 or NE 415) by which to forward the data packet to reach the egress NE 417 and forwards the data packet to the identified next element.

Figure 5:
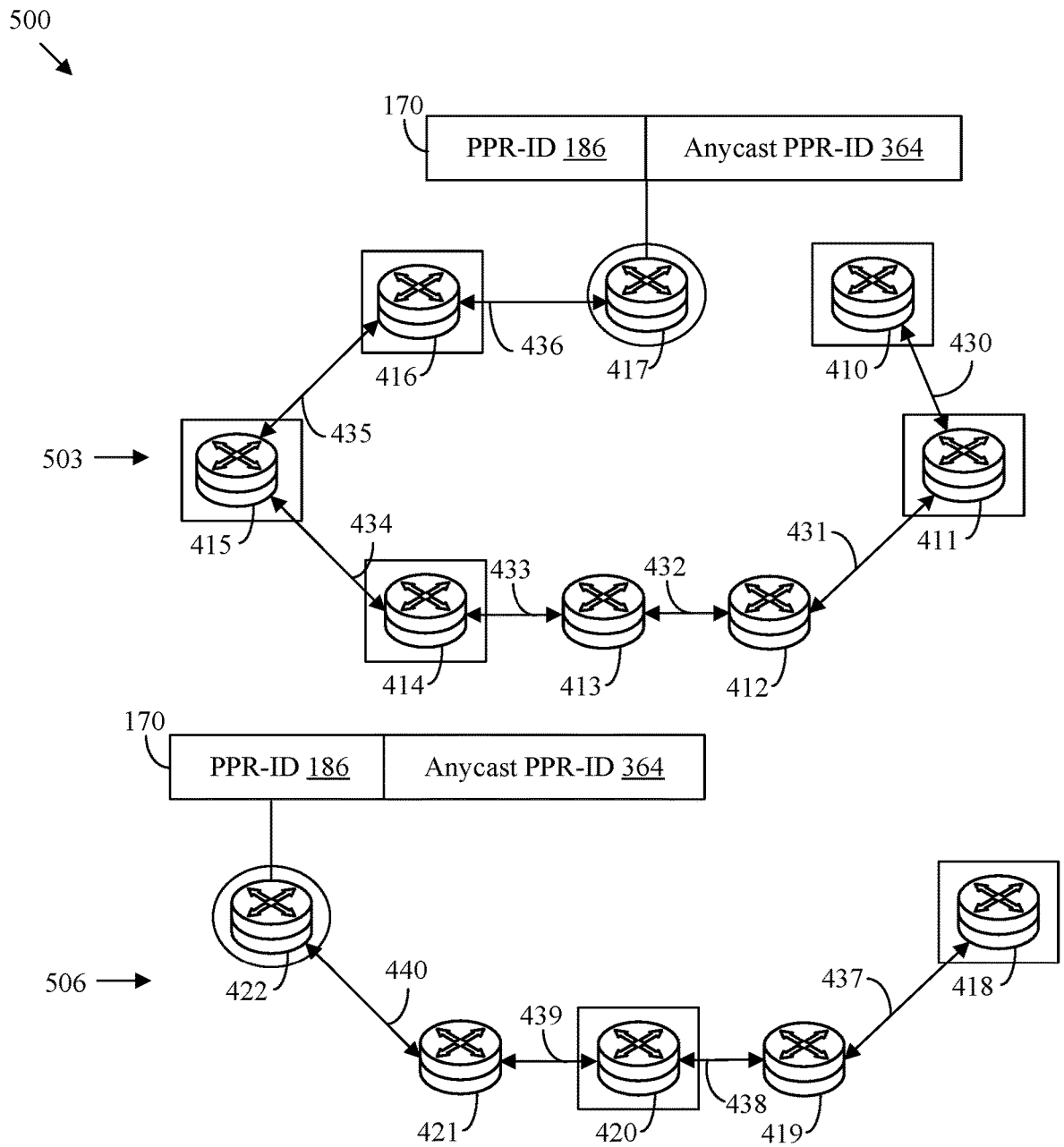
FIG. 5 is a diagram illustrating another embodiment of an anycast PPR graph configured to implement anycast addressing and routing methodologies according to various embodiments of the disclosure.

FIG. 5 is a diagram illustrating another embodiment of an anycast PPR graph 500 configured to implement anycast addressing and routing methodologies according to various embodiments of the disclosure. The anycast PPR graph 500 is similar to the anycast PPR graph 400, except that the anycast PPR graph 500 includes two bidirectional forests 503 and 506. A bidirectional forest 503 and 506 includes a bidirectional path between multiple ingress NEs and multiple egress NEs. In the example shown in FIG. 5, the bidirectional forest 503 only includes a single egress NE 417, and the bidirectional forest 506 only includes a single egress NE 422. However, it should be appreciated that each of the bidirectional forests 503 and 506 may include multiple egress NEs. Similar to FIG. 4, in FIG. 5, the egress NEs 417 and 422 are represented with circles, and the ingress NEs 410, 411, 414, 415, 416, 418, and 420 are represented with rectangles.

Similar to the PPR tree 403, the bidirectional forest 503 includes NEs 410-417 interconnected by links 430-436. Similar to the PPR tree 406, the bidirectional forest 506 includes NEs 418-422 interconnected by links 437-440. The control plane mechanisms for advertising the PPR information 170 describing the anycast PPR graph 500 from the central entity 165 to the NEs 410-422 is the same as the control plane mechanisms for advertising the PPR information 170 for the anycast PPR graph 400. In the data plane, the NEs 410-422 may include forwarding entries 359 for egress NEs 417 and 422 in both directions, instead of just one direction.

Figure 6:
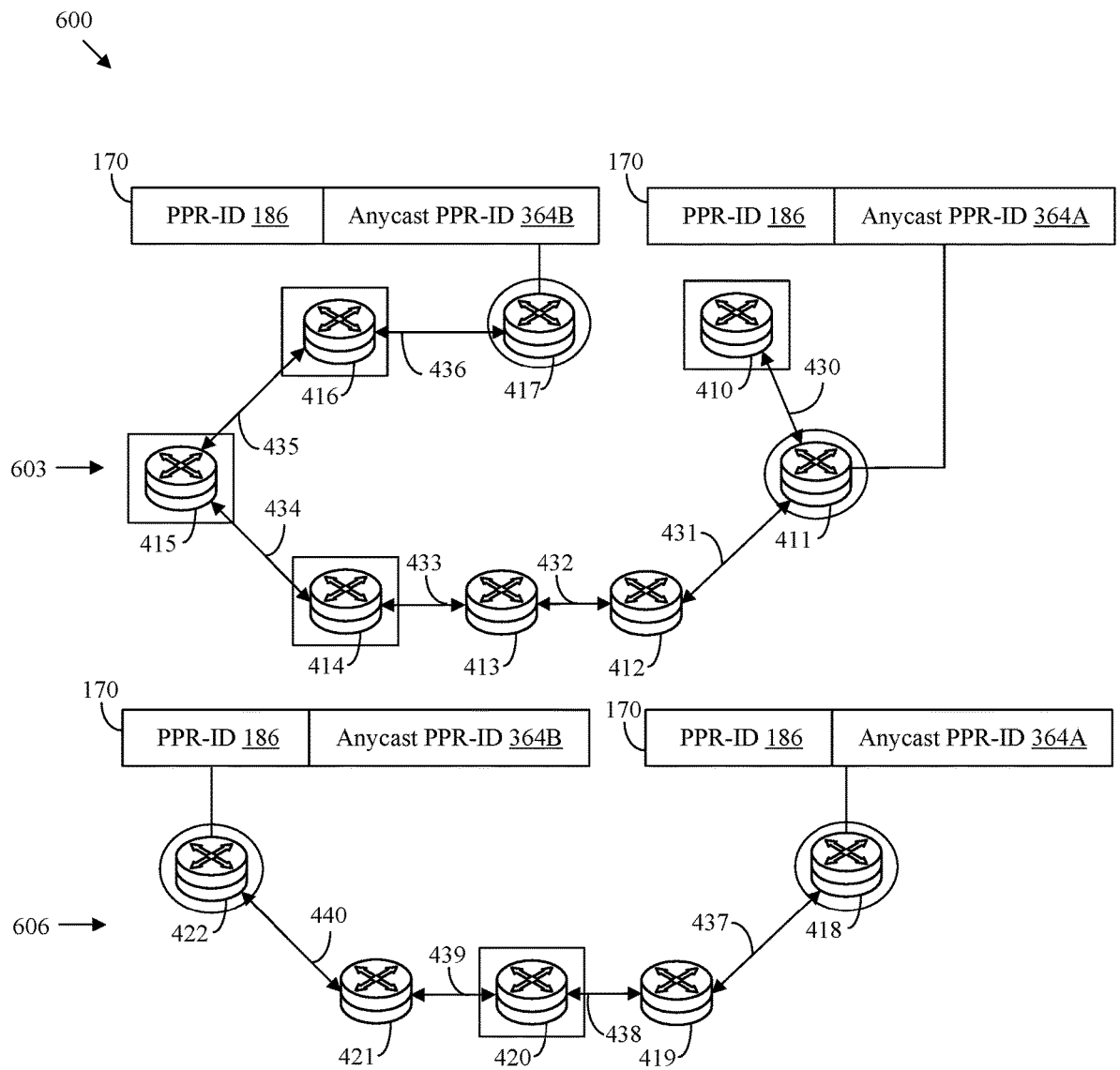
FIG. 6 is a diagram illustrating yet another embodiment of an anycast PPR graph configured to implement anycast addressing and routing methodologies according to various embodiments of the disclosure.

FIG. 6 is a diagram illustrating yet another embodiment of an anycast PPR graph 600 configured to implement anycast addressing and routing methodologies according to various embodiments of the disclosure. The anycast PPR graph 600 is similar to the anycast PPR graph 500, except that the anycast PPR graph 600 includes two bidirectional forests 603 and 606 that each have multiple egress NEs associated with different anycast groups.

Similar to the bidirectional forest 503, the bidirectional forest 603 includes NEs 410-417 interconnected by links 430-436. Similar to bidirectional forest 606, the bidirectional forest 606 includes NEs 418-422 interconnected by links 437-440. Unlike the bidirectional forest 503, the bidirectional forest 603 includes ingress NEs 410, 414, 415, and 416 represented with rectangles, and egress NEs 411 and 417 represented with circles. Egress NE 411 is associated with a first anycast group represented by a first anycast PPR-ID 364A. Egress NE 417 is associated with a second anycast group represented by a second anycast PPR-ID 364B. The bidirectional forest 606 includes a single ingress NE 420 represented with a rectangle and egress NEs 418 and 422 represented with circles. The egress NE 418 is associated with the first anycast group represented by the first anycast PPR-ID 364A. The egress NE 422 is associated with the second anycast group represented by the second anycast PPR-ID 364B.

In the control plane, the central entity 165 determines or obtains the anycast PPR-ID 364A for egress NEs 411 and 418 and the anycast PPR-ID 364B for egress NEs 417 and 422. The central entity 165 then generates the PPR information 170 describing the anycast PPR graph 600, including the PPR-ID 186 representing the anycast PPR graph 600, the anycast PPR-ID 364A for egress NEs 411 and 418, and the anycast PPR-ID 364B for egress NEs 417 and 422. In an embodiment, the anycast PPR-ID 364A may be included in the PPR-PDEs 190 describing egress NEs 411 and 418. In this embodiment, the anycast PPR-ID 364B may be included in the PPR-PDEs describing egress NEs 417 and 422.

In an embodiment, the central entity 165 may send the PPR information 170 to at least one of the NEs 410-422 in a network, such that the PPR information 170 is flooded through the entire network, as described above with reference to FIGS. 1A-B. After receiving the PPR information 170, each of the NEs 410-422 identified in the PPR-PDEs 190 of the PPR information 170 updates the forwarding database 365 to include a forwarding entry 359. The forwarding entry 359 may include the PPR-ID 186 of the anycast PPR graph 600, the anycast PPR-ID 364A for egress NEs 411 and 418, the anycast PPR-ID 364B for egress NEs 417 and 422, and/or a next element (e.g., next hop) on the anycast PPR graph 600 toward one of the egress NEs 411, 418, 417, or 422.

In some cases, two different anycast PPR graphs may share NEs, some of which are egress NEs included in the same anycast group, and thus have the same anycast PPR-ID 364. In this case, the shared NE that is part of the two different anycast PPR graphs may not be able to determine how to transmit a data packet with the anycast PPR-ID 364 as the destination. In an embodiment, an anycast group PPR-ID 367 may be included in the PPR information 170 such that the shared NE may use the anycast group PPR-ID 367 to identify the egress NE within the anycast group and determine how to transmit the data packet to the identified egress NE.

Figure 7A:
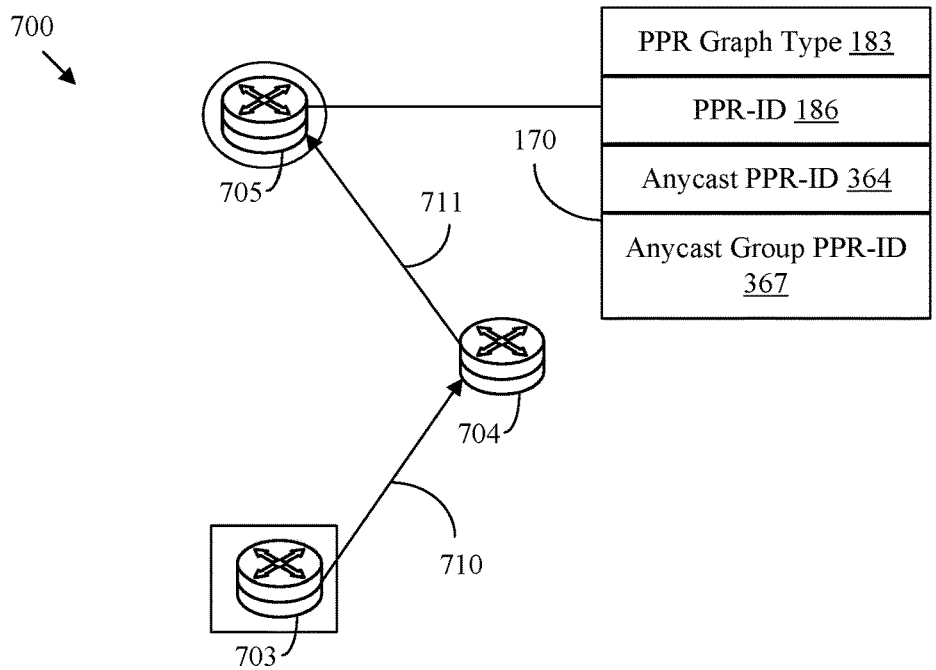
FIGS. 7A-C are diagrams illustrating the use of an anycast group PPR-ID to implement anycast addressing and routing methodologies according to various embodiments of the disclosure.
Figure 7B:
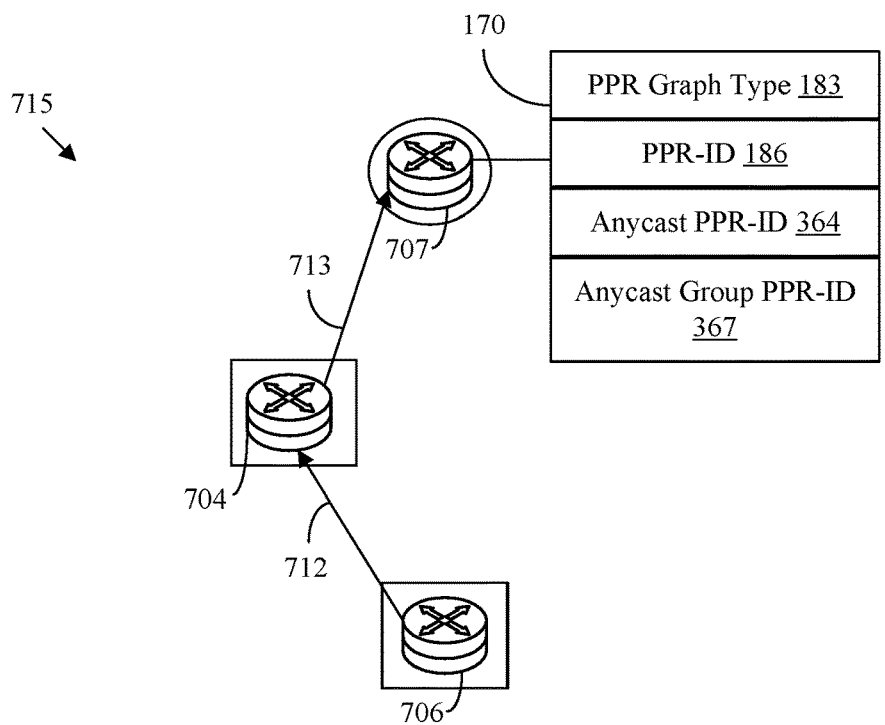
Figure 7C:
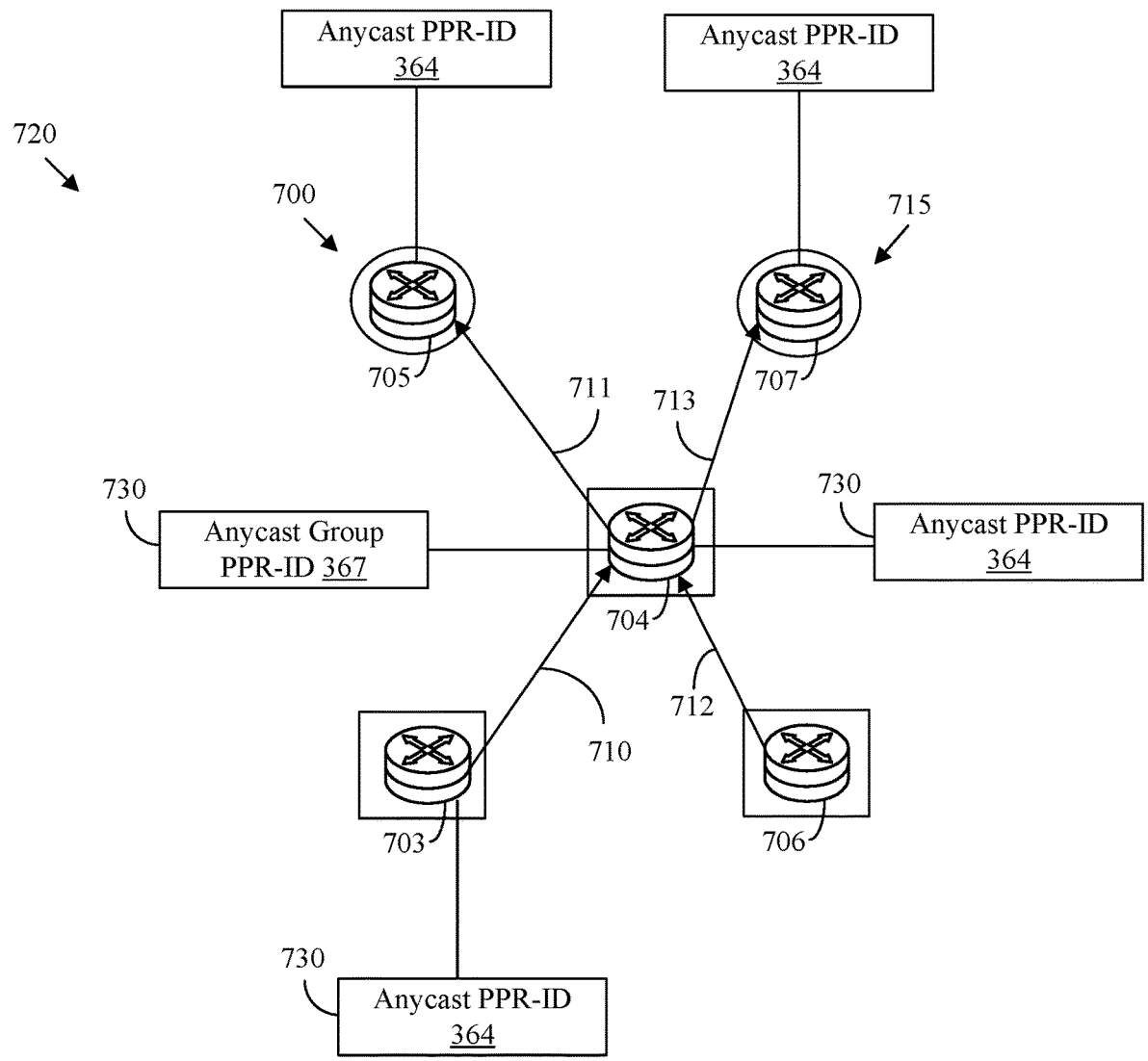

FIGS. 7A-C are diagrams illustrating the use of an anycast group PPR-ID 367 to implement anycast addressing and routing methodologies according to various embodiments of the disclosure. In particular, FIG. 7A is a diagram illustrating a PPR tree 700, FIG. 7B is a diagram illustrating a PPR tree 715, and FIG. 7C is a diagram illustrating a PPR graph 720 including the PPR tree 700 and the PPR tree 715.

Referring now to FIG. 7A, shown is a PPR tree 700 including NEs 703-705, each of which are similar to NEs 101-121 of FIGS. 1A-B. NEs 703-705 are interconnected by links 710-711, which are similar to links 122-154 of FIGS. 1A-B. In PPR tree 700, ingress NE 703 is represented with a rectangle, and egress NE 705 is represented with a circle. The NE 704 positioned between the ingress NE 703 and egress NE 705 is an intermediate NE 704.

In an embodiment, the egress NE 705 is a member of an anycast group having the anycast group PPR-ID 367 as the shared address of all members within the anycast group. In this embodiment, the PPR information 170 representing the PPR tree 700 may include a PPR graph type 183 indicating that the PPR tree 700 implements anycast addressing and routing mechanisms. The PPR information 170 further includes a PPR-ID 186, which identifies the PPR tree 700, and may include a label, address, or identifier of the egress NE 705. The PPR information 170 further includes the anycast PPR-ID 364, representing the anycast group including the egress NE 705.

However, since all members of an anycast group are assigned same anycast PPR-ID 364, intermediate NEs 704 may not be able to distinguish between different egress NEs 705 of the same anycast group. In various embodiments, each member of the anycast group may be assigned a different anycast group PPR-ID 367 such that intermediate NE 704 may distinguish between different egress NEs 705 in a common anycast group. For example, the central entity 165 may determine or obtain the anycast group PPR-ID 367 for each egress NE 705 in an anycast group and transmit the anycast group PPR-ID 367 in the PPR information 170 to one or more NEs in the network.

In this embodiment, the PPR information 170 further includes the anycast group PPR-ID 367 uniquely representing each member within an anycast group. In an embodiment, the anycast group PPR-ID 367 may be a unicast address, label, or identifier representing the egress NE 705, which may be encoded according to a transmission protocol implemented by the network. In an embodiment, the PPR-PDE 190 representing egress NE 705 carries the anycast group PPR-ID 367 for egress NE 705. In this embodiment, the egress NE 705 is addressed by both the anycast PPR-ID 364 and the anycast group PPR-ID 367. In an embodiment, each of the NEs 703-705 in the PPR tree 700 stores the PPR information 170 in a forwarding entry 359 of a local forwarding database 365.

Referring now to FIG. 7B, shown is a PPR tree 715 including NEs 704, 706, and 707, each of which are similar to NEs 101-121 of FIGS. 1A-B. NEs 704, 706, and 707 are interconnected by links 712-713, which are similar to links 122-154 of FIGS. 1A-B. As shown by FIGS. 7A and 7B, PPR tree 700 and PPR tree 715 share NE 704. However, unlike PPR tree 700, the NE 704 in PPR tree 715 is also an ingress NE 704. In PPR tree 715, ingress NEs 704 and 706 are represented with rectangles, and egress NE 707 is represented with a circle.

In this example, the egress NE 707 is associated with the same anycast group as the egress NE 705 of PPR tree 700. That is, the egress NE 707 is addressed by the same anycast PPR-ID 364 as the egress NE 705 of PPR tree 700.

In an embodiment, each of the members of an anycast group is assigned a different anycast group PPR-ID 367 such that intermediate NEs 704 can distinguish between egress NEs 705 and 707 of the same anycast group but different PPR trees 700 and 715. In this case, the egress NE 707 is also addressed by an anycast group PPR-ID 367, which is different from the anycast group PPR-ID 367 of egress NE 705.

In an embodiment, the PPR information 170 representing the PPR tree 715 may include a PPR graph type 183 indicating that the PPR tree 715 implements anycast addressing and routing mechanisms. The PPR information 170 further includes a PPR-ID 186, which identifies the PPR tree 715, and may include a label, address, or identifier of the egress NE 707. The PPR information 170 further includes the anycast PPR-ID 364 assigned to the egress NE 707. In an embodiment, the PPR information 170 further includes the anycast group PPR-ID 367 uniquely representing the egress NE 707, within the anycast group identified by the anycast PPR-ID 364. In an embodiment, each of the NEs

706, 704, and 707 in the PPR tree 715 stores the PPR information 170 in a forwarding entry 359 in a local forwarding database 365.

FIG. 7C is a diagram illustrating a PPR graph 720 including the PPR tree 700 and the PPR tree 715. In particular, FIG. 7C is a diagram illustrating how data packets 730 are transmitted through the PPR graph 720 using the anycast group PPR-ID 367. As described above with reference to FIGS. 7A-B, data packets 730 that are sourced at the ingress NE 703 with a destination of the anycast PPR-ID 364 should be transmitted towards egress NE 705 via intermediate NE 704. Data packets 730 that are sourced at the ingress NE 706 or ingress NE 704 with a destination of the anycast PPR-ID 364 should be transmitted towards egress NE 707 via intermediate NE 704. In some embodiments, NEs 703-707 are configured transmit data packets 730 with the same anycast PPPR-ID 364 to different egress NEs 705 and 707 using the anycast group PPR-ID 367.

For example, ingress NE 703 receives an anycast data packet 730, which includes a destination address and user data. The destination address may include the anycast PPR-ID 364 of egress NE 705. In this case, the ingress NE 703 determines the anycast group PPR-ID 367 for the egress NE 705 toward which to forward the anycast data packet 730 based on the ingress NE 703 being identified as the source or ingress NE 703 of the PPR tree 700 and the anycast PPR-ID 364. For example, ingress NE 703 performs a lookup at the local forwarding database 365 to identify the forwarding entry 359 indicating the ingress NE 703 as the source and an anycast group PPR-ID 367 of the egress NE 705 based on the anycast PPR-ID 364.

In an embodiment, the ingress NE 703 inserts the anycast group PPR-ID 367 of egress NE 705 into the anycast data packet 730, for example, via encapsulation or encoding. Ingress NE 703 then forwards the anycast data packet 730 to the next element (e.g., NE 704) on the PPR graph 720 via link 710.

NE 704 performs determines a next element (e.g., egress NE 705) by which to forward the anycast data packet 730 based on the forwarding entry 359 and the anycast group PPR-ID 367 of egress NE 705. NE 704 forwards the data packet over link 711 to egress NE 705.

The egress NE 705 receives the anycast data packet 730 with the anycast group PPR-ID 367 of egress NE 705, and then determines that the egress NE 705 is the destination of the anycast data packet 730, which was initially addressed to the egress NE 705 using the anycast PPR-ID 364. In an embodiment, the egress NE 705 removes the anycast group PPR-ID 367 from the anycast data packet 730 and inserts the anycast PPR-ID 364 back into the anycast data packet 730 before forwarding the anycast data packet 730 to the final destination or application. For example, the egress NE 705 may encode the anycast data packet 730 to include the anycast PPR-ID 364 instead of the anycast group PPR-ID 367, or decapsulate the anycast data packet 730 to remove the anycast group PPR-ID 367.

As another example, ingress NE 704 receives an anycast data packet 730, which includes the anycast PPR-ID 364 as the destination of the anycast data packet 730. The ingress NE 704 determines the anycast group PPR-ID 367 for the egress NE 707 toward which to forward the anycast data packet 730 based on the ingress NE 704 being identified as the source or ingress NE 704 of the PPR tree 715 and the anycast PPR-ID 364. Similar to that described above, the ingress NE 704 inserts the anycast PPR-ID 364 of the egress NE 707 into the anycast data packet 730 and forwards the anycast data packet 730 to the next element (e.g., egress NE 707) via link 713. The egress NE 707 may determine that the egress NE 707 is the destination of the anycast data packet 730, which was originally addressed to the egress NE 707 using the anycast PPR-ID 364. The egress NE 707 replaces the anycast group PPR-ID 367 for the egress NE 707 in the anycast data packet 730 with the anycast PPR-ID 364 before forwarding the anycast data packet 730 to the final destination or application. While not described herein, ingress NE 706 in the PPR tree 715 may perform similar steps when forwarding an anycast data packet 730 to the egress NE 707.

Figure 8:
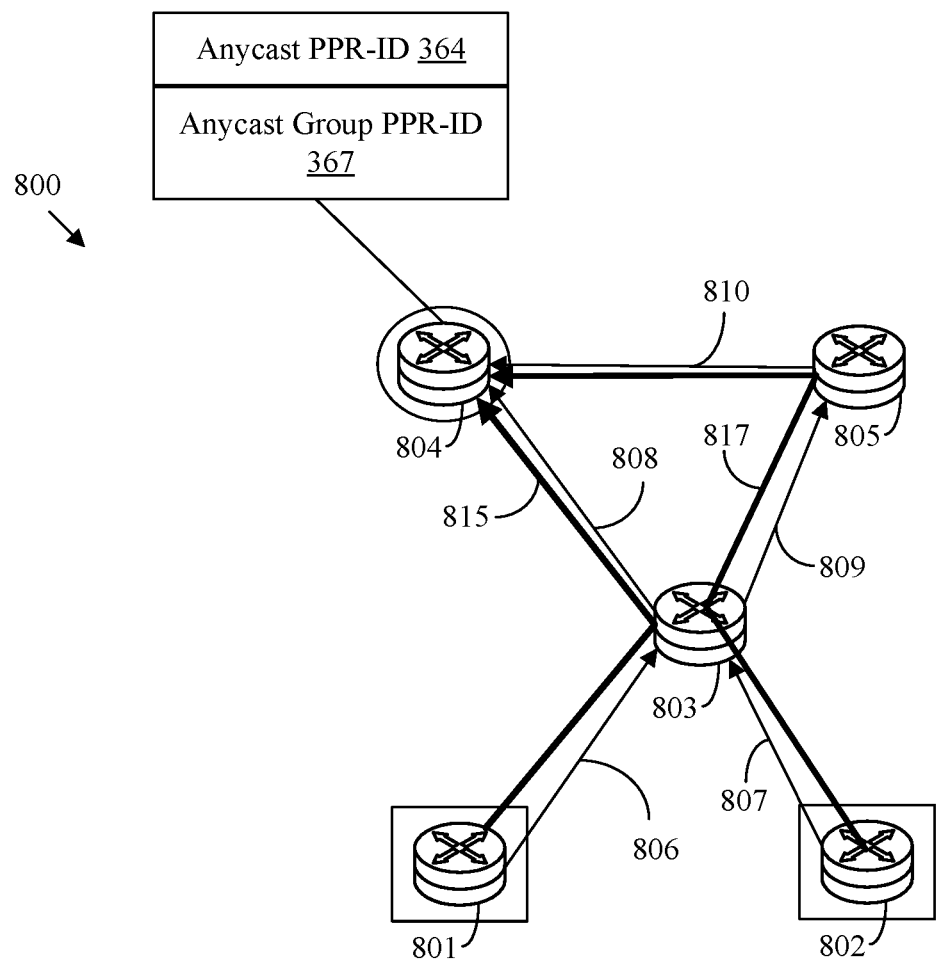
FIG. 8 is a diagram illustrating the use of an anycast group PPR-ID in an anycast PPR graph to implement anycast addressing and routing methodologies for a single egress NE according to various embodiments of the disclosure.

FIG. 8 is a diagram illustrating the use of an anycast group PPR-ID 367 in an anycast PPR graph 800 to implement anycast addressing and routing methodologies for a single egress NE according to various embodiments of the disclosure. The anycast PPR graph 800 includes NEs 801-805, each of which are similar to NEs 101-121 of FIGS. 1A-B. The NEs 801-805 are interconnected by links 806-810, which are similar to links 122-154 of FIGS. 1A-B. The anycast graph 800 includes ingress NEs 801 and 802 and a single egress NE 804.

In an embodiment, the egress NE 804 is associated with an anycast PPR-ID 364 and an anycast group PPR-ID 367. In this embodiment, there may be only one egress NE 804 currently assigned to the anycast group corresponding to the anycast PPR-ID 364. In this embodiment, the anycast group PPR-ID 367 is assigned to the egress NE 804 to better allocate paths and resources toward egress NE 804.

For example, there may be a case in which one of the links 806-810 on the anycast PPR graph 800 has insufficient resources to transmit data to the egress 804. There also may be a case in which one of these links 806-810 fails. For example, link 808 and/or link 810 may no longer be configured to carry traffic from ingress NEs 801 and 802 at the speed that is required for the traffic to be transmitted. In this case, two different anycast group PPR-IDs 367 may be associated with two different branches 815 and 817 within the anycast PPR graph 800 and assigned to the egress NE 804 such that traffic from ingress NE 801 travels through one branch 815 and traffic from ingress NE 802 passes through the other branch 817.

For example, within the anycast PPR graph 800, there may be branches 815 and 816, similar to PPRs 160, from an ingress NE 801 or 802 to the egress NE 804. A first branch 815 may include ingress NE 801, link 806, NE 803, link 808, and egress NE 804. A second branch 817 may include ingress NE 802, link 807, NE 803, link 809, NE 805, link 810, and egress NE 804.

A first anycast group PPR-ID 367 corresponding to the first branch 815 and the ingress NE 801 may be assigned to the egress NE 804, for example, by the central entity 165. In this case, when the ingress NE 801 receives an anycast data packet 730 destined for egress NE 804 (either by including the PPR-ID 186 or anycast PPR-ID 364 of the egress NE 804), the ingress NE 801 inserts the first anycast group PPR-ID 367 into the anycast data packet 730. Then, ingress NE 801 forwards the anycast data packet 730 along the first branch 815 to egress NE 804.

A second anycast group PPR-ID 367 corresponding to the second branch 817 and the ingress NE 802 may also be assigned to the egress NE 804, for example, by the central entity 165. In this case, when the ingress NE 802 receives a anycast data packet 730 destined for egress NE 804 (either by the PPR-ID 183 or anycast PPR-ID 364 of the egress NE 804), the ingress NE 802 inserts the second anycast group PPR-ID 367 into the anycast data packet 730. Then ingress NE 802 forwards the anycast data packet 730 along the second branch 817 to egress NE 804.

In this way, the anycast group PPR-ID 367 can be used not only to distinguish between members within an anycast group, but also to better allocate network resources within a network implementing anycast PPR graphs 800. By having multiple anycast group PPR-IDs 367 corresponding to a single egress NE 804, NEs 801-803 and 805 can forward traffic more efficiently and effectively within the network. In this way, traffic reaches the egress NE 804 faster, while better balancing the load of network utilization within the network.

Figure 9:
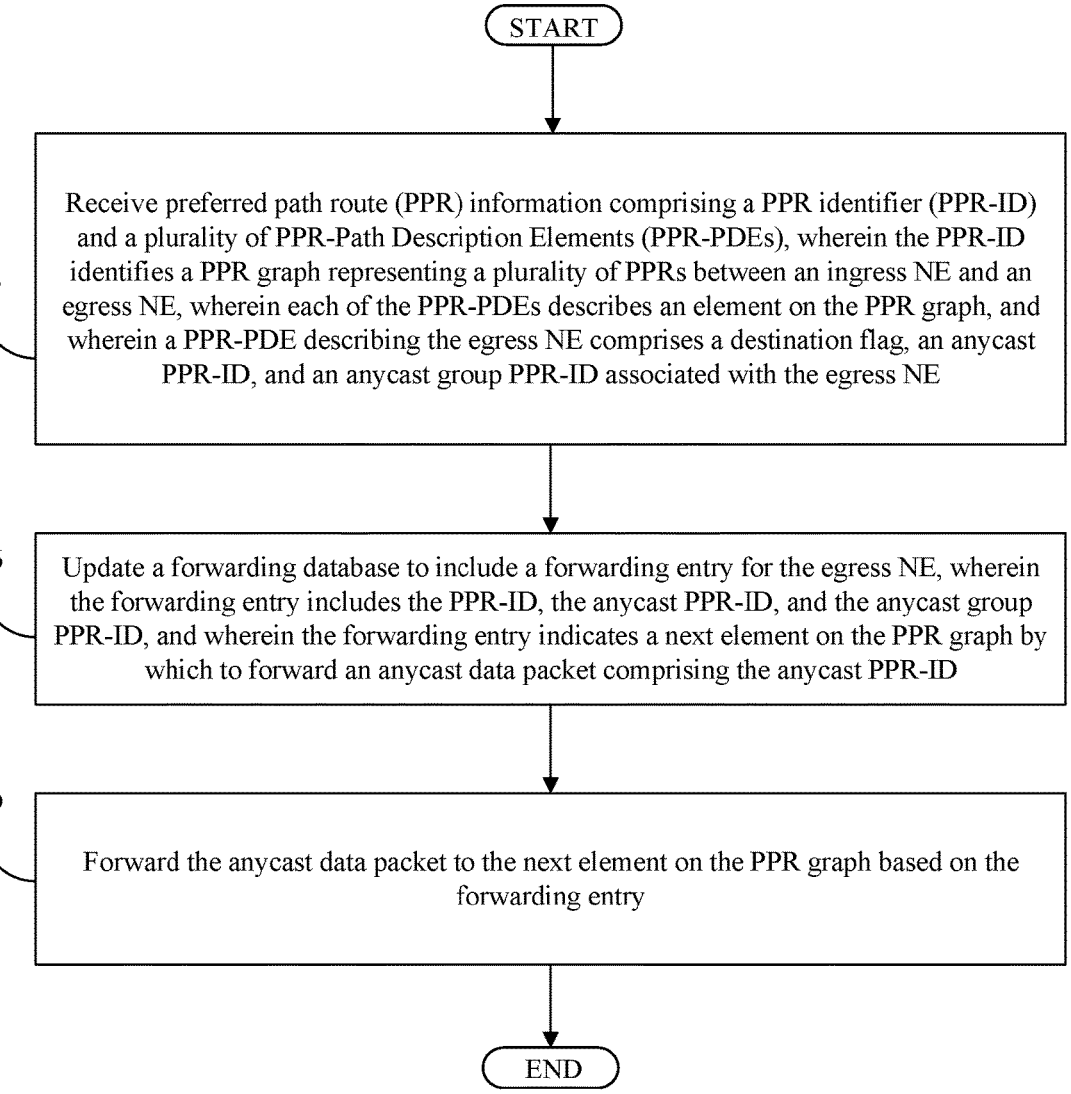
FIG. 9 is a flowchart of a method of implementing anycast addressing and routing methodologies according to various embodiments of the disclosure.

FIG. 9 is a flowchart of a method 900 of implementing anycast addressing and routing methodologies according to various embodiments of the disclosure. Method 900 may be implemented by NE 300, which may be implemented as one of the NEs 410-422, 703-707, or 801-805. Method 900 may be implemented after PPR information 170 describing an anycast PPR graph 180, 400, 500, 600, 720, or 800 is received from a central entity 165 or another one of the NEs in the network 100 or 175.

At step 903, PPR information 170 describing an anycast PPR graph 180, 400, 500, 600, 720, or 800 is received. The anycast PPR graph 180, 400, 500, 600, 720, or 800 represents a plurality of PPRs 160 between an ingress NE and an egress NE in the network. The PPR information 170 includes a PPR-ID 186 identifying the anycast PPR graph 180, 400, 500, 600, 720, or 800 and a plurality of PPR-PDEs 190 describing one or more elements included in the anycast PPR graph 180, 400, 500, 600, 720, or 800. A PPR-PDE 190 describing an ingress NE includes a source flag 191. A PPR-PDE 190 describing an egress NE includes a destination flag 193, an anycast PPR-ID 364, and an anycast group PPR-ID 367 associated with the egress NE. For example, the Rx 320 receives the PPR information 170 from the central entity 165 or another NE in the network 100 or 175.

At step 906, a forwarding database 365 is updated to include a forwarding entry 359 for the egress NE. The forwarding entry 359 includes the PPR-ID 186, the anycast PPR-ID 364, and the anycast group PPR-ID 367. The forwarding entry 359 also indicates a next element on the anycast PPR graph 180, 400, 500, 600, 720, or 800 by which to forward an anycast data packet 730 comprising the anycast PPR-ID 364. For example, the network configuration module 335 is executed by the processor 330 to update a forwarding database 365 to include a forwarding entry 359 for the egress NE in response to identifying the NE in the PPR-PDEs 190 received in the PPR information 170.

At step 909, the anycast data packet 730 is forwarded to the next element of the anycast PPR graph 180, 400, 500, 600, 720, or 800 based on the forwarding entry 359 indicating the PPR-PDEs 190. For example, Tx 340 forwards the anycast packet 730.

FIG. 10 is a diagram illustrating a PPR graph 1000 configured to enforce QoS parameters 370 according to various embodiments of the disclosure. The PPR graph 1000 is similar to the anycast PPR graphs 180, 400, 500, 600, 720, or 800, in that the PPR graph 1000 includes at least one path between at an ingress NE and an egress NE. However, the NEs in PPR graph 1000 are additionally configured to enforce QoS parameters 370 at each ingress NE of the PPR graph 1000.

As shown by FIG. 10, PPR graph 1000 includes NEs 1001-1008, each of which are similar to NEs 101-121 of FIGS. 1A-B. NEs 1001-1008 are interconnected by links 1110-1116, which are similar to links 122-154 of FIGS. 1A-B. The PPR graph 1000 includes ingress NEs 1001, 1002, 1003, 1005, 1006, and 1007, each of which are represented with circles. The PPR graph 1000 also includes one egress NE 1008, which is represented with a rectangle.

The NEs 1001-1008 within PPR graph 1000 are configured to enforce QoS attributes 370 at a per-ingress NE level instead of at a broader PPR graph level. That is, instead of enforcing a single QoS attribute 370 for all of the resources along the PPR graph 1000, the embodiments disclosed herein enable each ingress NE 1001, 1002, 1003, 1005, 1006, and 1007 within a PPR graph 1000 to reserve resources differently as required along the PPR graph 1000.

In an embodiment, each ingress NE 1001, 1002, 1003, 1005, 1006, and 1007 is associated with a QoS attribute 370, which refers to a network attribute associated with a resource that is permitted to be enforced or required to be enforced by the ingress NE 1001, 1002, 1003, 1005, 1006, and 1007 of the PPR graph 1000. The QoS attribute 370 refers to any type of network resource that may be reserved at an NE 1001-1008 or link 1110-1116 of a PPR graph 1000. For example, the QoS attribute 370 may be at least one of a bandwidth required to transmit a data packet along the PPR graph 1000, a buffer size of a buffer at an NE 1001-1008, a burst size permitted to be transmitted along the outgoing element of an NE 1001-1008, a bounded latency permitted to occur at an NE 1001-1008, or a lifetime indicating a time period during which the resource is to be reserved at an NE 1001-1008 or link 1110-1116 of a PPR graph 1000.

In the control plane, the PPR information 170 for the PPR graph 1000 includes the QoS attribute 370 for each ingress NE 1001, 1002, 1003, 1005, 1006, and 1007 on the PPR graph 1000. In an embodiment, the PPR-PDEs 190 for each of the ingress NEs 1001, 1002, 1003, 1005, 1006, and 1007 includes the respective QoS attribute 370 for the ingress NE 1001, 1002, 1003, 1005, 1006, and 1007. In an embodiment, the PPR information 170 also includes a maximum QoS attribute 373 for the PPR graph 1000. The maximum QoS attribute 373 refers to a maximum amount of the particular resource that is permitted to be reserved at an NE 1001-1008 or link 1110-1116 of a PPR graph 1000.

Continuing with the control plane, when each ingress NE 1001, 1002, 1003, 1005, 1006, and 1007 receives the PPR information 170 including the QoS attribute 370 for each of the ingress NEs 1001, 1002, 1003, 1005, 1006, and 1007 within the PPR graph 1000, each ingress NE 1001, 1002, 1003, 1005, 1006, and 1007 computes an aggregated QoS attribute 1035 based on the QoS attribute 370 for each of the previous ingress NEs 1001, 1002, 1003, 1005, 1006, and 1007. In an embodiment, the aggregate QoS attribute 1035 refers to a sum of each of the QoS attributes 370 for each of a plurality of previous ingress NEs 1001, 1002, 1003, 1005, 1006, and 1007 that are downstream (e.g., opposite direction from the egress NE 1008) on the PPR graph 1000.

For example, the QoS attribute 370 for the ingress NE 1001 is 2 megabits per second (Mbps), the QoS attribute 370 for the ingress NE 1002 is 1 Mbps, the QoS attribute 370 for the ingress NE 1003 is 1 Mbps, the QoS attribute 370 for the ingress NE 1005 is 1 Mbps, the QoS attribute 370 for the ingress NE 1006 is 2 Mbps, and the QoS attribute 370 for the ingress NE 1007 is 1 Mbps. In this example, after the ingress NE 1005 receives the PPR information 170 for PPR graph 1000, including the QoS attributes 370 for each of the ingress NEs 1001, 1002, 1003, 1005, 1006, and 1007, the ingress NE 1005 determines an aggregate QoS attribute 1035 for the ingress NE 1005. The ingress NE 1005 determines the aggregate QoS attribute 1035 by computing a sum of all of the QoS attributes 370 for the previous ingress NE 1003 downstream of ingress NE 1005 and the QoS attribute 370 for the ingress NE 1005. In this case, the ingress NE 1005 computes a sum of 1 Mbps (e.g., the QoS attribute 370 for ingress NE 1003) and 1 Mbps (e.g., the QoS attribute 370 for the ingress NE 1005), which is 2 Mbps. In this case, the aggregate QoS attribute 1035 at ingress NE 1005 is 2 Mbps.

In an embodiment, the ingress NE 1005 compares the aggregate QoS attribute 1035 with the maximum QoS attribute 373. When the aggregate QoS attribute 1035 is less than the maximum QoS attribute 373, the ingress NE 1005 reserves a resource along an outgoing element of the ingress NE 1005 (e.g., at link 1114) based on the aggregate QoS attribute 1035. For example, when the maximum QoS attribute 373 is 5 Mbps, the aggregate QoS attribute 1035 at the ingress NE 1005 of 2 Mpbs is less than the maximum QoS attribute 373 of 5 Mbps. In this case, the ingress NE 1005 may reserve 2 Mbps (e.g., the aggregate QoS attribute 1035) of bandwidth along the outgoing element (e.g., link 1114) for transmitting traffic from the ingress NE 1005 to the egress NE 1008 along PPR graph 1000. For example, the link-state database 361 and/or the forwarding database 365 may be updated to reflect the resource reservation.

Continuing with this example, each of the ingress NEs 1001, 1002, 1003, 1005, 1006, and 1007 on the PPR graph 1000 computes the aggregate QoS attribute 1035 at the respective ingress NE 1001, 1002, 1003, 1005, 1006, and 1007 and then compares the aggregate QoS attribute 1035 with the maximum QoS attribute 373. As another illustrative example, after the ingress NE 1006 receives the PPR information 170 for PPR graph 1000, including the QoS attributes 370 for each of the ingress NEs 1001, 1002, 1003, 1005, 1006, and 1007, the ingress NE 1006 determines an aggregate QoS attribute 1035 for the ingress NE 1006. The ingress 1006 determines the aggregate QoS attribute 1035 by computing a sum of all of the QoS attributes 370 for the previous ingress NEs 1001, 1002, 1003, and 1005 downstream of ingress NE 1006 and the QoS attribute 370 for the ingress NE 1006. In this case, the ingress NE 1006 computes a sum of 2 Mbps (e.g., the QoS attribute 370 for ingress NE 1001), 1 Mbps (e.g., the QoS attribute 370 for ingress NE 1002), 1 Mbps (e.g., the QoS attribute 370 for ingress NE 1003), 1 Mbps (e.g., the QoS attribute 370 for the ingress NE 1005), and 2 Mbps (e.g., the QoS attribute 370 for the ingress NE 1006), which is 7 Mbps. In this case, the aggregate QoS attribute 1035 at ingress NE 1006 is 7 Mbps.

In an embodiment, the ingress NE 1006 compares the aggregate QoS attribute 1035 with the maximum QoS attribute 373. When the aggregate QoS attribute 1035 is greater than the maximum QoS attribute 373, the ingress NE 1006 reserves a resource along an outgoing element of the ingress NE 1006 (e.g., at link 1115) based on the maximum QoS attribute 373. For example, when the maximum QoS attribute 373 is 5 Mbps, the aggregate QoS attribute 1035 at ingress NE 1006 of 7 Mbps is greater than the maximum QoS attribute 373 of 5 Mbps. In this case, the ingress NE 1006 may reserve 5 Mbps (e.g., the maximum QoS attribute 373) of bandwidth along the outgoing element (e.g., link 1115) for transmitting traffic from the ingress NE 1006 to the egress NE 1008 along PPR graph 1000. For example, the link-state database 361 and/or the forwarding database 365 may be updated to reflect the resource reservation.

These embodiments take direct advantage of the compact and scalable forms of PPR graphs 1000 to implement QoS attributes 370, which may be particularly applicable to large scale platforms with a large number of users, such as videoconferencing. In particular, the methods of encoding QoS attributes 370 for each ingress NE 1001, 1002, 1003, 1005, 1006, and 1007 enable a more fine-tuned and accurate mechanism for guaranteeing QoS for a client or a user. These embodiments also allow bandwidth to be shared between different ingress NEs 1001, 1002, 1003, 1005, 1006, and 1007 without having to allocate non-shared bandwidth.

While FIG. 10 shows QoS attribute 370 enforcement in a PPR graph 1000 with a single egress NE 1008, PPR graphs implemented as a forest or bidirectional forest may also perform QoS attribute 370 enforcement. In this case, bandwidth may be shared not only between different ingress NEs 1001, 1002, 1003, 1005, 1006, and 1007, but also between different egress NEs 1008.

FIG. 11 is a flowchart of a method 1100 of enforcing QoS attributes 370 within PPR graphs 1000 according to various embodiments of the disclosure. Method 1100 may be implemented by one of the ingress NEs 1001, 1002, 1003, 1005, 1006, and 1007 of the PPR graph 1000. Method 1100 may be implemented after PPR information 170 including QoS attributes 370 for each of the ingress NEs 1001, 1002, 1003, 1005, 1006, and 1007 and/or the maximum QoS attribute 373 is received by each of the ingress NEs 1001, 1002, 1003, 1005, 1006, and 1007 in network 100 or 175 from a central entity 165 or another NE.

At step 1103, PPR information 170 describing a PPR graph 1000 is received. The PPR graph 1000 represents a plurality of PPRs 160 between an ingress NE and an egress NE in the network. The PPR information 170 includes a PPR-ID 186 and multiple PPR-PDEs 190, each describing an element on the PPR graph 1000. A PPR-PDE 190 describing an egress NE 1008 includes a destination flag 193. A PPR-PDE 190 describing an ingress NE 1001, 1002, 1003, 1005, 1006, and 1007 includes a source flag 191 and a QoS attribute 370 associated with a resource to be reserved on an outgoing element of the NE. In an embodiment, the PPR information 170 additionally includes the maximum QoS attribute 373. For example, the Rx 320 receives the PPR information 170 from another NE in the network or from the central entity 165.

At step 1106, the forwarding database 365 is updated to include a forwarding entry 359 for the egress NE 1108. The forwarding entry 359 includes the PPR-ID 186 and the QoS attribute 370. The forwarding entry 359 also indicates a next element on the PPR graph by which to forward a data packet comprising the PPR-ID 186. For example, the network configuration module 335 is executed by the processor 330 to update the forwarding database 365 to include the forwarding entry 359 for the egress NE 1108.

At step 1109, the resource along the outgoing element of the NE is reserved based on the PPR-PDEs 190 and the QoS attribute 370. In an embodiment, an aggregate QoS attribute 1035 may be determined by the NE based on the QoS attributes 370 for one or more previous ingress NEs 1001, 1002, 1003, 1005, 1006, and 1007 positioned downstream on the PPR graph 1000. In an embodiment, the aggregate QoS attribute 1035 may be compared to the maximum QoS attribute 373. When the aggregate QoS attribute 1035 is less than the maximum QoS attribute 373, the resource is reserved along the outgoing element of the NE based on the aggregate QoS attribute 1035. When the aggregate QoS attribute 1035 is greater than the maximum QoS attribute 373, the resource is reserved along the outgoing element of the NE based on the maximum QoS attribute 373. In an embodiment, the network configuration module 335 is executed by the processor 330 to determine the aggregate QoS attribute 1035, compare the aggregate QoS attribute 1035 to the maximum QoS attribute 373, and reserve the resource along the outgoing element of the NE based on the PPR-PDEs 190, aggregate QoS attribute 1035, and/or the maximum QoS attribute 373.

Figure 12A:
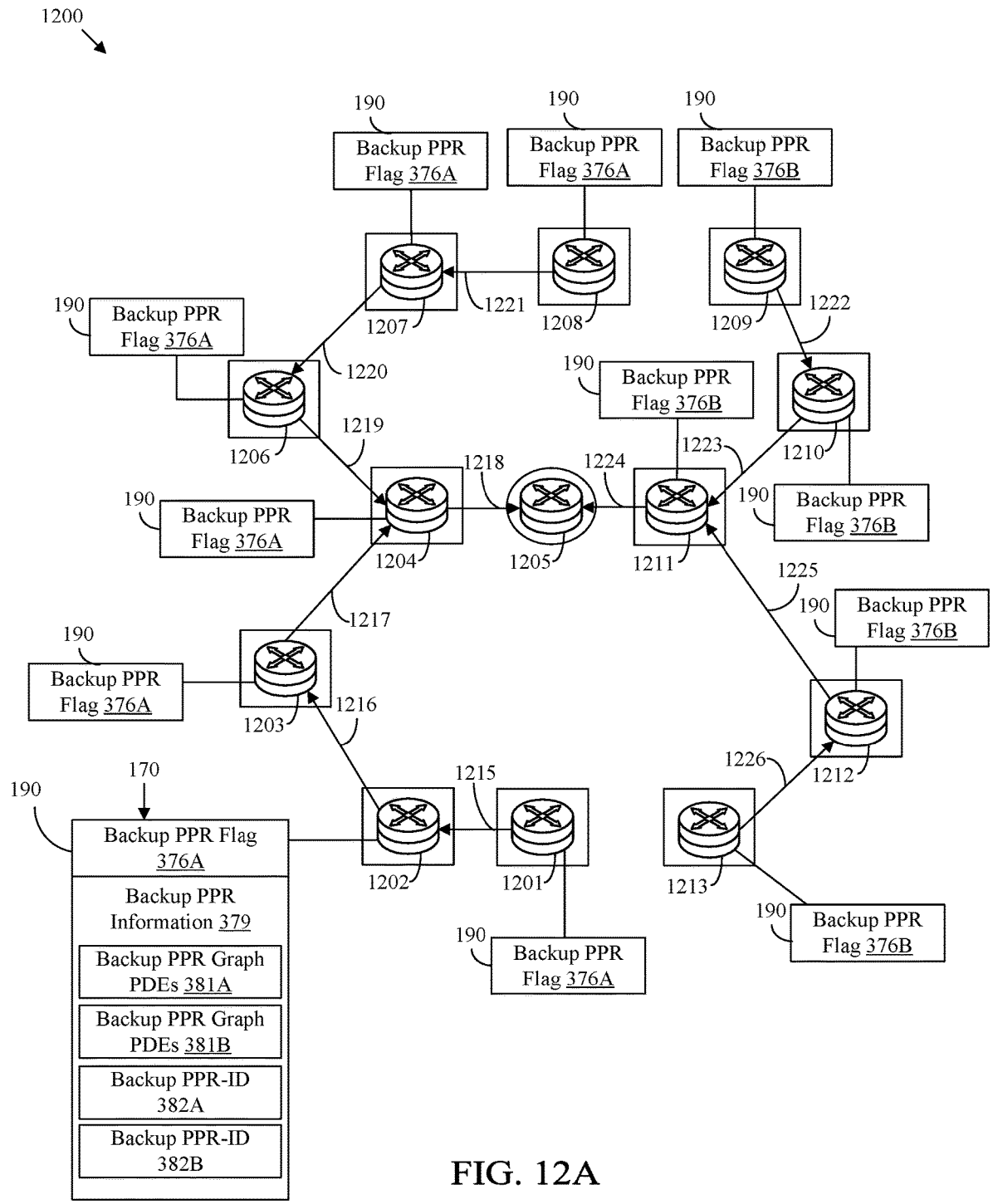
FIGS. 12A-C are diagrams illustrating the implementation of a fast reroute mechanism for PPR graphs according to various embodiments of the disclosure.
Figure 12B:
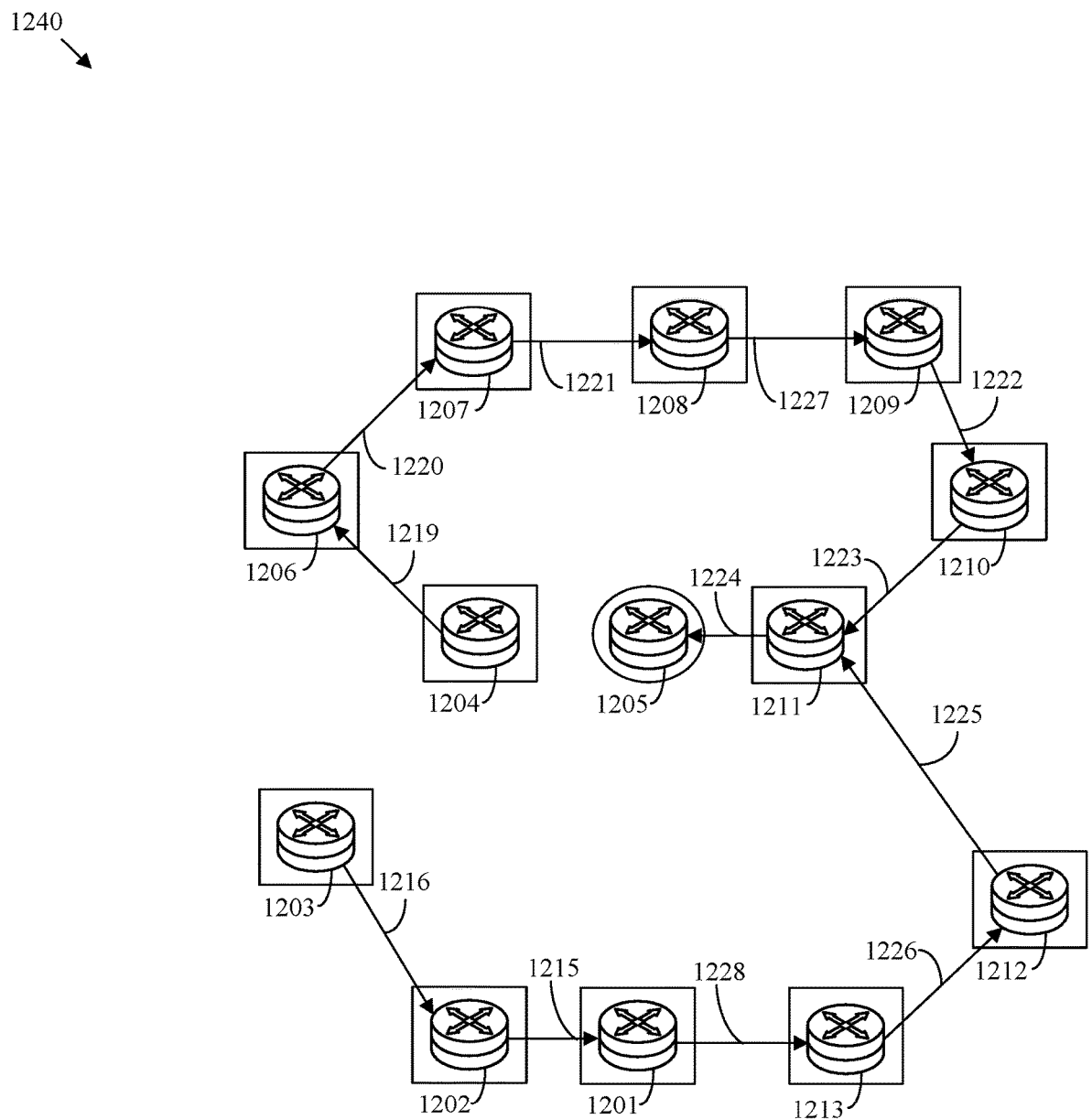
Figure 12C:
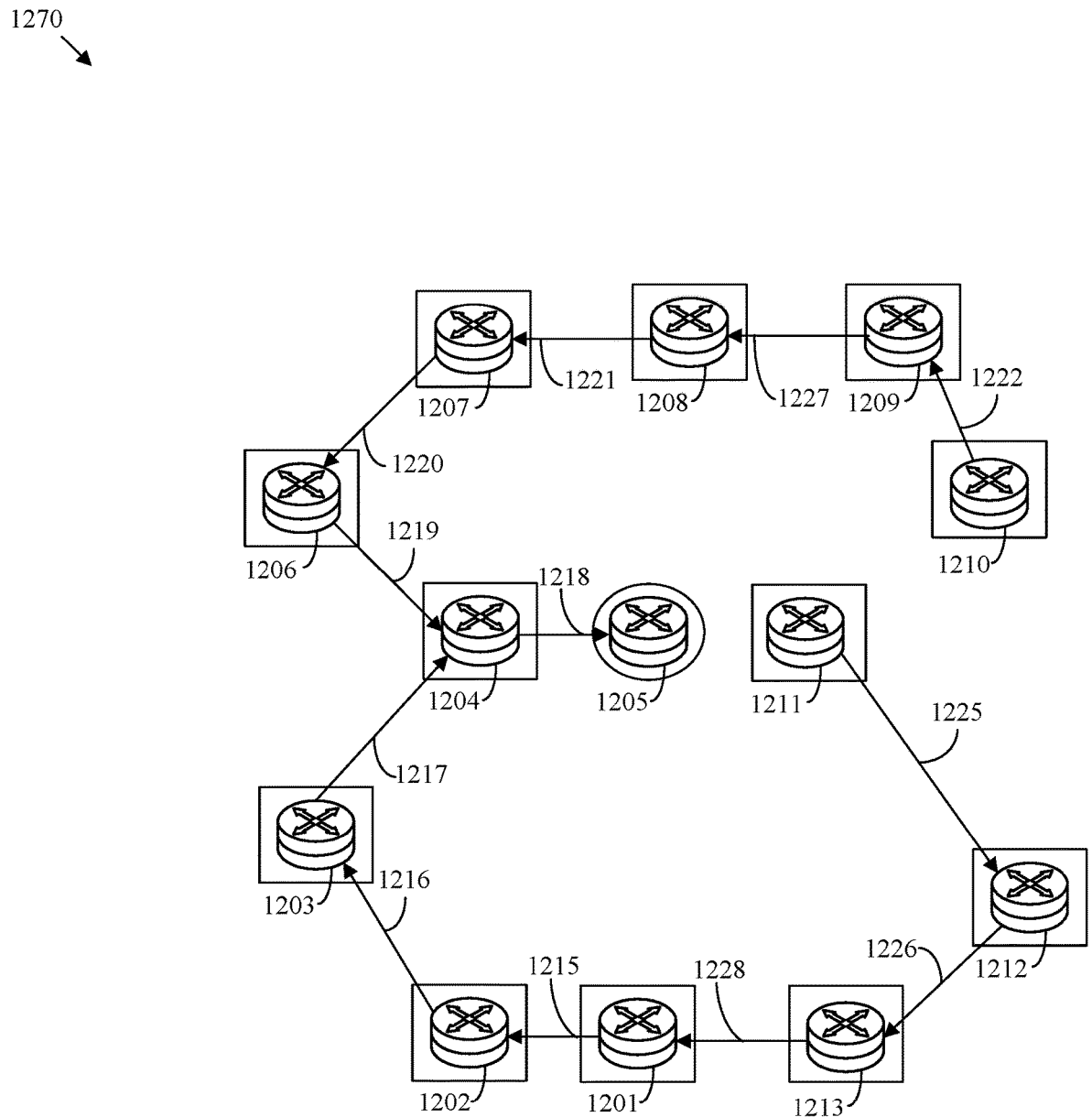
Figure 13:
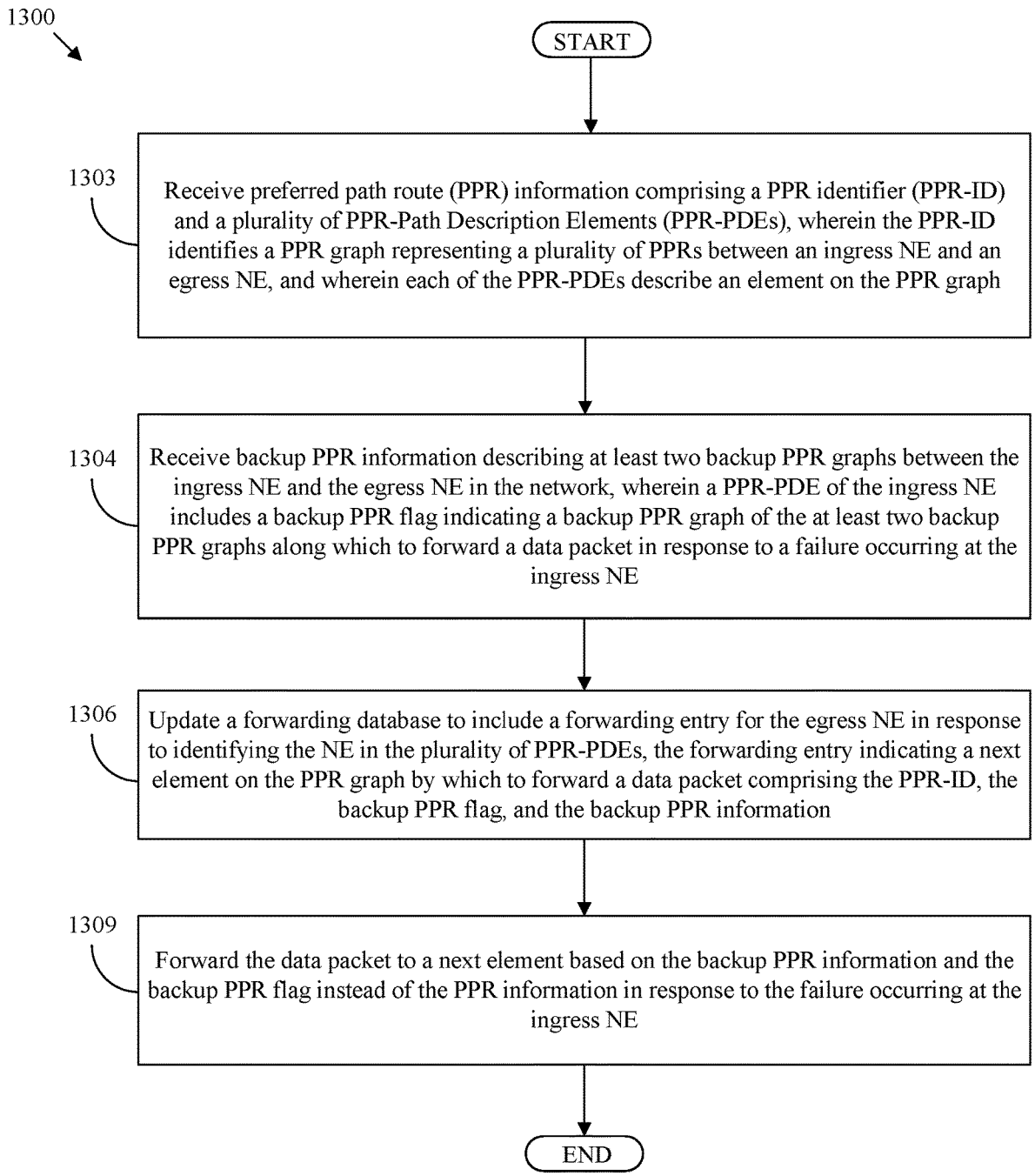
FIG. 13 is a flowchart of a method for performing a fast rerouting mechanism within a PPR graph according to various embodiments of the disclosure.

FIGS. 12A-C are diagrams illustrating the implementation of a fast reroute mechanism for PPR graphs upon failure of an NE or a link in a PPR graph according to various embodiments of the disclosure. In particular, FIG. 12A shows a PPR graph 1200 and PPR information 170 describing the PPR graph 1200, in which the PPR information 170 includes a backup PPR flag 376 for each ingress NE in the PPR graph 1200. FIG. 12B shows a first backup PPR graph 1240 for the PPR graph 1200, and FIG. 12C shows a second backup PPR graph 1270 for the PPR graph 1200. In an embodiment, the backup PPR flag 376 is included in a PPR-PDE 190 for each ingress NE of the PPR graph 1200 and indicates whether the ingress NE should use the first backup PPR graph 1240 or the second backup PPR graph 1270 upon failure of an adjacent NE or link on the PPR graph 1200.

Referring now to FIG. 12A, shown is a diagram illustrating a PPR graph 1200 configured to perform fast rerouting mechanisms using backup PPR flags 376 according to various embodiments of the disclosure. The PPR graph 1200 is similar to the PPR graphs 180, 400, 500, 600, 720, 800, and 1000, in that the PPR graph 1200 includes at least one path between an ingress NE and an egress NE. However, the NEs in PPR graph 1200 are additionally configured to perform fast rerouting mechanisms when an element on the PPR graph 1200 fails or is no longer available to transmit traffic.

As shown by FIG. 12A, PPR graph 1200 includes NEs 1201-1213, each of which are similar to NEs 101-121 of FIGS. 1A-B. NEs 1201-1213 are interconnected by links 1215-1226, which are similar to links 122-154 of FIGS. 1A-B. The PPR graph 1200 includes ingress NEs 1201-1204 and 1206-1213, each of which is represented with rectangles. The PPR graph 1200 also includes one egress NE 1205, which is represented with a circle.

In some embodiments, instead of having the same backup PPR graph for each of the ingress NEs 1201-1204 and 1206-1213 in the PPR graph 1200, the embodiments disclosed herein enable each ingress NE 1201-1204 and 1206-1213 within a PPR graph 1200 to have a particular backup PPR graph assigned specifically for the ingress NE 1201-1204 and 1206-1213. In the control plane, the PPR information 170 is flooded to each of the NEs 1201-1213 in a network or PPR graph 1200 and locally saved in a forwarding entry 359 of the forwarding database 365.

As shown by FIG. 12A, the PPR information 170 describing the PPR graph 1200 includes a backup PPR flag 376A-B and backup PPR information 379. In an embodiment, the backup PPR flag 376A-B is included in a PPR-PDE 190 for each ingress NE 1201-1204 and 1206-1213. The backup PPR information 379 includes backup PPR-IDs 382A-B and backup PPR graph PDEs 381A-B. In an embodiment, the backup PPR-IDs 382A-B include a label, address, or identifier identifying the backup PPR graph 1240 and the backup PPR graph 1270, respectively. In an embodiment, the backup PPR graph PDEs 381A-B includes one or more PDEs, similar to PPR-PDEs 190, describing one or more elements on backup PPR graphs 1240 and 1270, respectively. In this embodiment, the backup PPR flag 376A-B is a flag or bit indicating one of the backup PPR graphs 1240 or 1270 as being assigned to the ingress NE 1201-1204 and 1206-1213.

For example, as shown by FIG. 12A, the ingress NEs 1204-1204 and 1206-1208 are each associated with a PPR-PDE 190 including a backup PPR flag 376A, indicating that the backup PPR graph 1240 should be used as a backup path for ingress NEs 1204-1204 and 1206-1208. The backup PPR graph 1240 is shown and described below with reference to FIG. 12B. Meanwhile, ingress NEs 1209-1213 are each described by a PPR-PDE 190 including a backup PPR flag 376B, indicating that the backup PPR graph 1270 should be used as a backup path for ingress NEs 1209-1213. The backup PPR graph 1270 shown and described below with reference to FIG. 12C.

In an embodiment, in the data plane, when an ingress NE 1201-1204 or 1206-1213 or interface/link adjacent to the ingress NE 1201-1204 or 1206-1213 fails or is no longer available to transmit traffic, the ingress NE 1201-1204 or 1206-1213 searches the forwarding entry 359 for the PPR-PDE 190 corresponding the ingress NE 1201-1204 or 1206-1213. The forwarding entry 359 may indicate the backup PPR flag 376A-B for the ingress NE 1201-1204 or 1206-1213. For example, when link 1224 adjacent to ingress NE 1211 and on the path to the egress NE 1205 fails, ingress NE 1211 searches the forwarding database 365 for the forwarding entry 359 corresponding to the egress NE 1205 and the ingress NE 1211 to determine the backup PPR flag 376B. The backup PPR flag 376B indicates that when a failure occurs adjacent to or at ingress NE 1211 on the path to egress NE 1205, then the ingress NE 1211 reroutes data packets to the backup PPR graph 1270 shown and described below with reference to FIG. 12C.

The path by which the data packets are rerouted through the backup PPR graph 1270 is indicated by backup PPR-ID 382B and the backup PPR graph PDE 381B. In the data plane, when ingress NE 1211 receives a data packet destined for egress NE 1208 and when link 1224 fails, the PPR-ID 186 included in the data packet is replaced with the backup PPR-ID 382B identifying the backup PPR graph 1270. Then, the data packet is forwarded along the backup PPR graph 1270.

Similarly, when link 1219 adjacent to or at ingress NE 1206 on the path to egress NE 1205 fails, ingress NE 1206 searches the forwarding database 365 for the forwarding entry 359 corresponding to the egress NE 1205 and the ingress NE 1206 to determine the backup PPR flag 376A. The backup PPR flag 376A indicates that when a failure occurs adjacent to or at ingress NE 1206 on the path to egress NE 1205, then the ingress NE 1206 reroutes data packets to the backup PPR graph 1240 shown and described below with reference to FIG. 12B.

The path by which the data packets are rerouted through the backup PPR graph 1240 is indicated by backup PPR-ID 382A and the backup PPR graph PDE 381A. In the data plane, when ingress NE 1206 receives a data packet destined for egress NE 1208 and when link 1219 fails, the PPR-ID 186 included in the data packet is replaced with the backup PPR-ID 382A identifying the backup PPR graph 1240. Then, the data packet is forwarded along the backup PPR graph 1240.

Referring now to FIG. 12B, shown is a diagram illustrating the backup PPR graph 1240, which may be used to forward data packets upon a failure occurring adjacent to or at ingress NEs 1204-1204 and 1206-1208 of PPR graph 1200. The backup PPR graph 1240 is similar to the PPR graph 1200 in that the backup PPR graph 1240 includes NEs 1201-1213. Backup PPR graph 1240 includes links 1215-1216 and 1219-1228, which again are similar to links 122-154 of FIGS. 1A-B. Similar to PPR graph 1200 of FIG. 12A, the backup PPR graph 1240 includes a single egress NE 1205, represented with a circle, while the remaining NEs 1201-1204 and 1206-1213 are ingress NEs, represented with rectangles.

As discussed above, the backup PPR graph 1240 may be used when ingress NEs 1204-1204 and 1206-1208 or a link/interface adjacent to ingress NEs 1204-1204 and 1206-1208 on PPR graph 1200 fails. For example, when the link 1219 of PPR graph 1200 fails, ingress NE 1206 searches the forwarding database 365 for the forwarding entry 359 corresponding to the egress NE 1205 and the ingress NE 1206 to determine the backup PPR flag 376A. The backup PPR flag 376A indicates that when a failure occurs adjacent to or at ingress NE 1206 on the path to egress NE 1205, then the ingress NE 1206 reroutes data packets to the backup PPR graph 1240. In particular, data packets destined for egress NE 1205 are rerouted at the ingress NE 1206 from link 1219 to link 1220, as would be indicated in the backup PPR graph PDE 381A. The data packets will be forwarded along backup PPR graph 1240 (through NE 1207, link 1221, NE 1208, link 1227, NE 1209, link 1222, NE 1210, link 1223, NE 1211, and link 1224) to finally reach egress NE 1205. In this way, ingress NE 1206 is configured to detect a failure at or adjacent to the ingress NE 1206 and reroute a packet based on the backup PPR graph 1240 designated particularly for the ingress NE 1206.

Referring now to FIG. 12C, shown is a diagram illustrating the backup PPR graph 1270, which may be used to forward data packets upon a failure occurring adjacent to ingress NEs 1209-1213 of PPR graph 1200. The backup PPR graph 1270 is similar to the PPR graph 1200 in that the backup PPR graph 1270 includes NEs 1201-1213. Backup PPR graph 1270 includes links 1215-1222 and 1225-1228, which again are similar to links 122-154 of FIGS. 1A-B. Similar to PPR graph 1200 of FIG. 12A and the backup PPR graph 1240, the backup PPR graph 1270 includes a single egress NE 1205, represented with a circle, while the remaining NEs 1201-1204 and 1206-1213 are ingress NEs, represented with rectangles.

As discussed above, the backup PPR graph 1270 may be used when ingress NEs 1209-1213 or a link/interface adjacent to ingress NEs 1209-1213 on PPR graph 1200 fails. For example, when the link 1224 of PPR graph 1200 fails, ingress NE 1211 searches the forwarding database 365 for the forwarding entry 359 corresponding to the egress NE 1205 and the ingress NE 1211 to determine the backup PPR flag 376B. The backup PPR flag 376B indicates that when a failure occurs adjacent to or at ingress NE 1211 on the path to egress NE 1205, then the ingress NE 1211 reroutes data packets to the backup PPR graph 1270. In particular, data packets destined for egress NE 1205 are rerouted at the ingress NE 1211 from link 1224 to link 1225, as would be indicated in the backup PPR graph PDE 381B. The data packets will be forwarded along backup PPR graph 1270 (through link 1225, NE 1212, link 1226, NE 1213, link 1228, NE 1201, link 1215, NE 1202, link 1216, NE 1203, link 1217, and NE 1204) to finally reach egress NE 1205. In this way, ingress NE 1211 is configured to detect a failure adjacent to or at the ingress NE 1211 and reroute the packet based on a particular backup PPR graph 1270 designated particularly for the ingress NE 1211

The embodiments disclosed herein are advantageous for several reasons. First, the use of the backup PPR flags 376 within the PPR-PDEs 190 enables a much more compact mechanism of signaling backup routes for nodes in a network. In addition, the central entity 165 computes the backup PPR information 379 for each PPR graph 1200, and sends the backup PPR information 379 in the PPR information 170 for each PPR graph 1200 to an NE 1201-1213 in the network, which is then flooded through all the NEs in the network. Therefore, by using the backup PPR flag 376 and the backup PPR information 379, the NEs 1201-1213 on the PPR graph 1200 are configured to perform fast rerouting at an ingress NE level, while maintaining efficient and effective use of networking resources.

FIG. 13 is a flowchart of a method 1300 for performing fast rerouting mechanism within a PPR graph according to various embodiments of the disclosure. Method 1300 may be implemented by one of the ingress NEs 1201-1204 and 1205-1213 in PPR graph 1200. Method 1300 may be implemented after PPR information 170 including backup PPR information 379 and backup PPR flags 376 is received by one of the ingress NEs 1201-1204 and 1205-1213 in PPR graph 1200.

At step 1303, PPR information 170 describing the PPR graph 1200 between at least one ingress NE 1201-1204 and 1205-1213 and at least one egress NE 1205 in a network. The PPR information 170 also includes a PPR-ID 186 and multiple PPR-PDEs 190, each describing an element on the PPR graph 1200. At step 1304, backup PPR information 379 is received. The backup PPR information 379 describes at least two backup PPR graphs 1240 and 1270 between at least one ingress NE 1201-1204 and 1205-1213 and at least one egress NE 1205 in the network. A PPR-PDE 190 describing an ingress NE 1201-1204 or 1205-1213 includes a backup PPR flag 376 indicating a backup PPR graph 1240 or 1270 of the at least two backup PPR graphs 1240 and 1270 along which to forward a data packet in response to a failure occurring adjacent to the ingress NE 1201-1204 or 1205-1213. For example, the Rx 320 receives the PPR information 170 and backup PPR information 379 from another NE in the network or from the central entity 165.

At step 1306, the forwarding database 365 is updated to include a forwarding entry 359 for the egress NE 1205 in response to identifying the NE in the PPR-PDEs 190. The forwarding entry 359 including the PPR information 170 and the backup PPR flag 376. For example, the network configuration module 335 is executed by the processor 330 to update the forwarding database 365 to include the forwarding entry 359 for the egress NE 1205.

At step 1309, the data packet is forwarded to a next element based on the backup PPR information and the backup PPR flag instead of the PPR information in response to the failure occurring at the ingress NE. For example, the Tx 340 transmits the data packet to the next element based on the backup PPR information and the backup PPR flag instead of the PPR information in response to the failure occurring at the ingress NE.

Figure 14:
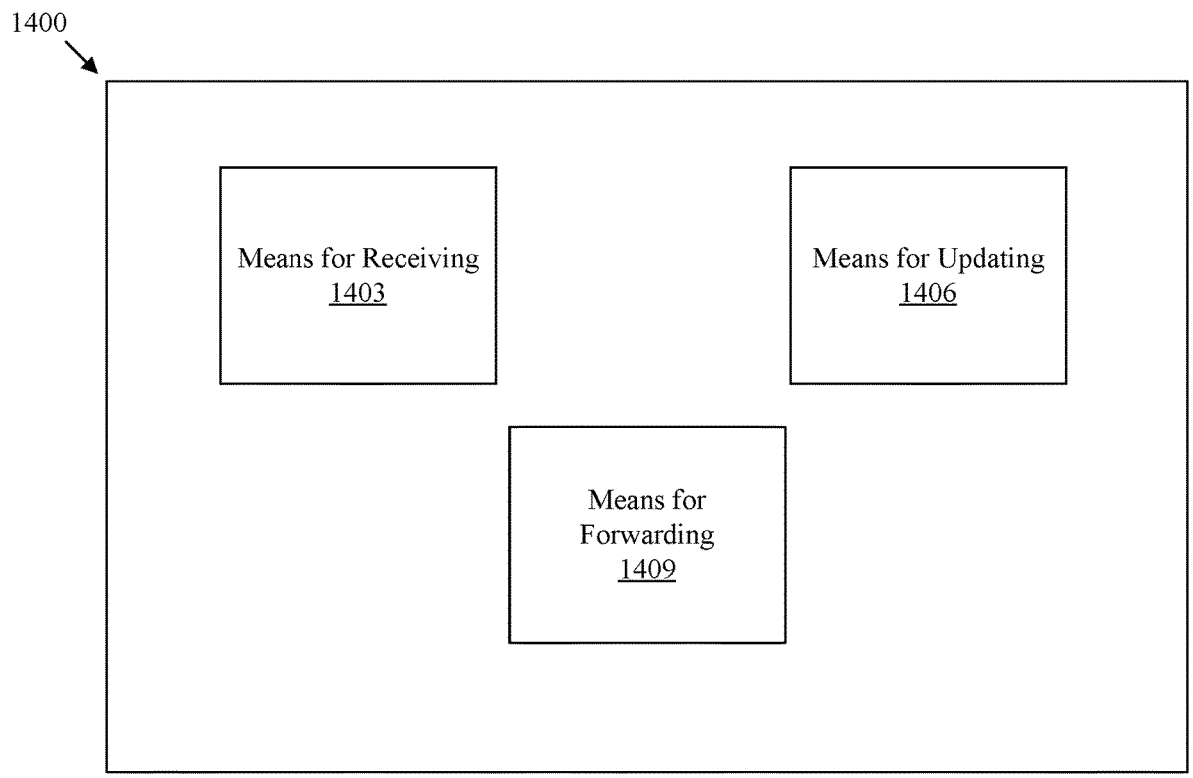
FIGS. 14-15 are diagrams of apparatuses configured to implement the advanced PPR graph features disclosed herein according to various embodiments of the disclosure.
Figure 15:
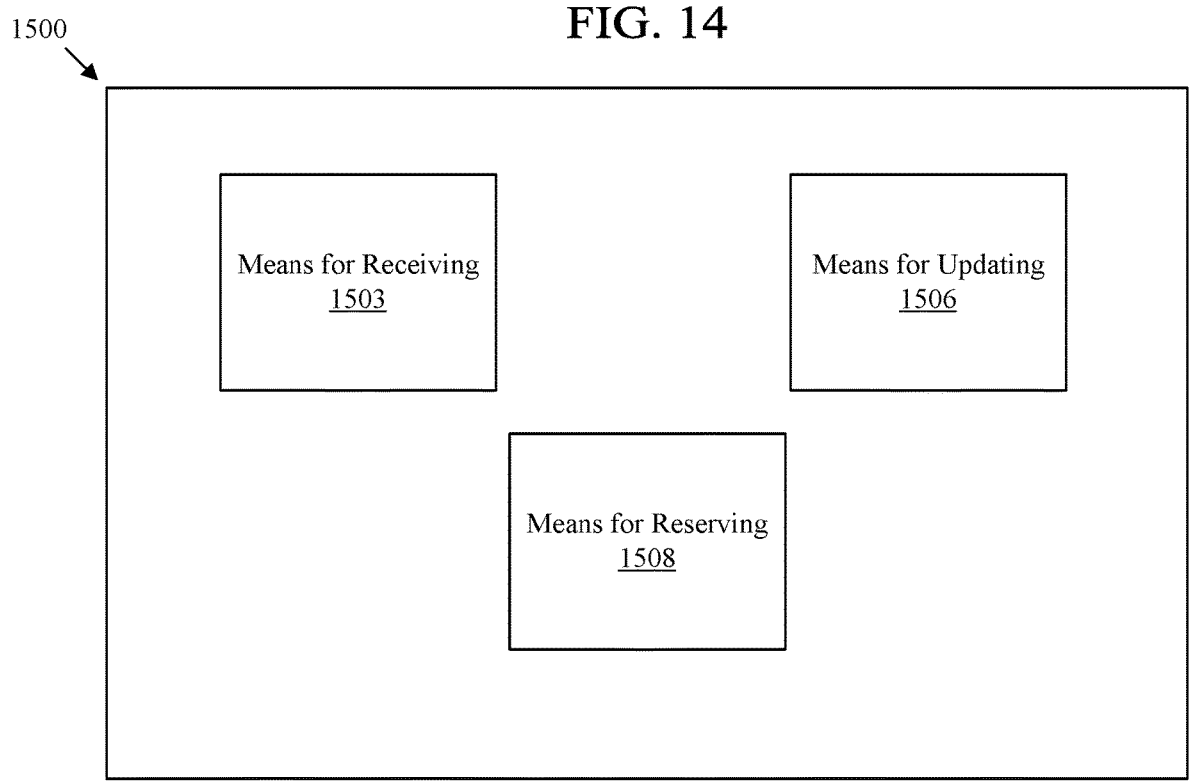

FIGS. 14-15 are diagrams of apparatuses 1400 and 1500 configured to implemented the advanced PPR graph features disclosed herein according to various embodiments of the disclosure. The apparatus 1400 of FIG. 14 is configured to implement method 900 and/or method 1300. The apparatus 1500 of FIG. 15 is configured to implement method 1100.

In an embodiment, the apparatus 1400 comprising a means for receiving 1403 PPR information 170 describing an anycast PPR graph 180, 400, 500, 600, 720, or 800 is received. The anycast PPR graph 180, 400, 500, 600, 720, or 800 represents a plurality of PPRs 160 between an ingress NE and an egress NE in the network. The PPR information 170 includes a PPR-ID 186 identifying the anycast PPR graph 180, 400, 500, 600, 720, or 800 and a plurality of PPR-PDEs 190 describing one or more elements included in the anycast PPR graph 180, 400, 500, 600, 720, or 800. A PPR-PDE 190 describing an ingress NE includes a source flag 191. A PPR-PDE 190 describing an egress NE includes a destination flag 193, an anycast PPR-ID 364, and an anycast group PPR-ID 367 associated with the egress NE. The apparatus 1400 comprises a means for updating 1406 a forwarding database 365 to include a forwarding entry 359 for the egress NE in response to identifying the NE in the PPR-PDEs 190 received in the PPR information 170. The forwarding entry 359 indicates a next element on the anycast PPR graph 180, 400, 500, 600, 720, or 800 by which to forward an anycast data packet 730 comprising the anycast PPR-ID 364. The apparatus 1400 includes a means for forwarding 1409 the anycast data packet 730 to the next element of the anycast PPR graph 180, 400, 500, 600, 720, or 800 based on the PPR-PDEs 190.

In another embodiment, apparatus 1400 comprises a means for receiving 1403 PPR information 170 and backup PPR information 379. The PPR information 170 describes the PPR graph 1200 between at least one ingress NE 1201-1204 and 1205-1213 and at least one egress NE 1205 in a network. The backup PPR information 379 describes at least two backup PPR graphs 1240 and 1270 between at least one ingress NE 1201-1204 and 1205-1213 and at least one egress NE 1205 in the network. The PPR information 170 also includes a PPR-ID 186 and multiple PPR-PDEs 190, each describing an element on the PPR graph 1200. A PPR-PDE 190 describing an ingress NE 1201-1204 or 1205-1213 includes a backup PPR flag 376 indicating a backup PPR graph 1240 or 1270 of the at least two backup PPR graphs 1240 and 1270 along which to forward a data packet in response to a failure occurring adjacent to the ingress NE 1201-1204 or 1205-1213. For example, the Rx 320 receives the PPR information 170 and backup PPR information 379 from another NE in the network or from the central entity 165. In this embodiment, apparatus 1400 comprises a means for updating 1406 the forwarding database 365 to include a forwarding entry 359 for the egress NE 1205 in response to identifying the NE in the PPR-PDEs 190. The forwarding entry 359 including the PPR information 170 and the backup PPR flag 376. In this embodiment, the apparatus 1400 comprises a means for forwarding 1409 the data packet to a next element based on the backup PPR information and the backup PPR flag instead of the PPR information in response to the failure occurring at the ingress NE.

Apparatus 1500 comprises a means for receiving 1503 PPR information 170 describing a PPR graph 1000. The PPR graph 1000 represents a plurality of PPRs 160 between an ingress NE and an egress NE in the network. The PPR information 170 includes a PPR-ID 186 and multiple PPR-PDEs 190, each describing an element on the PPR graph 190. A PPR-PDE 190 describing an egress NE 1008 includes a destination flag 193. A PPR-PDE 190 describing an ingress NE 1001, 1002, 1003, 1005, 1006, and 1007 includes a source flag 191 and a QoS attribute 370 associated with a resource to be reserved on an outgoing element of the NE. In an embodiment, the PPR information 170 additionally includes the maximum QoS attribute 373. In this embodiment, the apparatus 1500 comprises a means for updating 1506 a forwarding database 365 to include a forwarding entry 359 for the egress NE 1108 in response to identifying the NE in the PPR-PDEs 190. The forwarding entry 359 indicates a next element on the PPR graph by which to forward a data packet comprising the PPR-ID 186. In this embodiment, apparatus 1500 comprises a means for reserving 1508 resource along the outgoing element of the NE based on the PPR-PDEs 190 and the QoS attribute 370. In an embodiment, an aggregate QoS attribute 1035 may be determined by the NE based on the QoS attributes 370 for one or more previous ingress NEs 1001, 1002, 1003, 1005, 1006, and 1007 positioned downstream on the PPR graph 1000. In an embodiment, the aggregate QoS attribute 1035 may be compared to the maximum QoS attribute 373. When the aggregate QoS attribute 1035 is less than the maximum QoS attribute 373, the resource is reserved along the outgoing element of the NE based on the aggregate QoS attribute 1035. When the aggregate QoS attribute 1035 is greater than the maximum QoS attribute 373, the resource is reserved along the outgoing element of the NE based on the maximum QoS attribute 373. In an embodiment, the network configuration module 335 is executed by the processor 330 to determine the aggregate QoS attribute 1035, compare the aggregate QoS attribute 1035 to the maximum QoS attribute 373, and reserve the resource along the outgoing element of the NE based on the PPR-PDEs 190, aggregate QoS attribute 1035, and/or the maximum QoS attribute 373.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a network element (NE) in a network, comprising:

receiving preferred path route (PPR) information comprising a PPR identifier (PPR-ID) and a plurality of PPR-Path Description Elements (PPR-PDEs), the PPR-ID identifying a PPR graph representing a plurality of PPRs between one or more ingress NEs and one or more egress NEs, each PPR-PDE of the plurality of PPR-PDEs describing an element on the PPR graph, a first PPR-PDE comprising a destination flag indicating that the first PPR-PDE identifies an egress NE in the network, an anycast PPR-ID identifying the egress NE, and an anycast group PPR-ID identifying an anycast group including the egress NE;

updating a forwarding database to include a forwarding entry for the egress NE, the forwarding entry including the PPR-ID, the anycast PPR-ID, and the anycast group PPR-ID, the forwarding entry indicating a next element on the PPR graph by which to forward an anycast data packet comprising the anycast PPR-ID; and forwarding the anycast data packet to the next element on the PPR graph based on the forwarding entry.

2. The method of claim 1, wherein the NE is an ingress NE and the method further comprises:

receiving the anycast data packet comprising the anycast PPR-ID; and replacing the anycast PPR-ID included in the anycast data packet with the anycast group PPR-ID based on the first PPR-PDE describing the egress NE.

3. The method of claim 1, wherein the NE is the egress NE and the method further comprises:
receiving the anycast data packet comprising the anycast group PPR-ID; and
replacing the anycast group PPR-ID included in the anycast data packet with the anycast PPR-ID based on the first PPR-PDE describing the egress NE.

4. The method of claim 1, wherein the PPR information is carried in an advertisement comprising a PPR-ID header carrying the PPR-ID.

5. The method of claim 1, wherein the PPR information is received from a central entity of the network.

6. The method of claim 1, wherein the PPR graph comprises a plurality of branches, wherein each branch comprises a plurality of elements on a path between two NEs included in the PPR graph.

7. A method implemented by a network element (NE) in a network, comprising:
receiving preferred path route (PPR) information comprising a PPR identifier (PPR-ID) and a plurality of PPR-Path Description Elements (PPR-PDEs), the PPR-ID identifying a PPR graph representing a plurality of PPRs between one or more ingress NEs and one or more egress NEs, each PPR-PDE of the plurality of PPR-PDEs describing an element on the PPR graph, a second PPR-PDE comprising a source flag and a quality of service (QoS) attribute associated with a resource to be reserved along an outgoing element of the ingress NE, the source flag indicating that the second PPR-PDE identifies the ingress NE in the network;
updating a forwarding database to include a forwarding entry including the PPR-ID and the QoS attribute associated with the resource to be reserved along the outgoing element of the NE;
reserving the resource along the outgoing element of the NE in response to receiving the PPR information.

8. The method of claim 7, further comprising computing a sum of a NE QoS of the NE and a plurality of QoS attributes for a plurality of previous source NEs on the PPR graph, wherein the resource is reserved along the outgoing element of the NE based on the sum.

9. The method of claim 8, wherein the PPR information further comprises a maximum QoS attribute associated with the PPR graph.

10. The method of claim 9, wherein the resource is reserved along the outgoing element of the NE based on the maximum QoS attribute when the sum is greater than the maximum QoS attribute.

11. The method of claim 7, wherein the QoS attribute associated with the resource to be reserved along the outgoing element of the NE is at least one of a bandwidth required to transmit the data packet along the PPR graph, a buffer size of a buffer at the NE, a burst size permitted to be transmitted along the outgoing element of the NE, a bounded latency permitted to occur at the NE, or a lifetime indicating a time period during which the resource is to be reserved along the outgoing element of the NE.

12. The method of claim 7, wherein the PPR information is received from a central entity of the network.

13. A method implemented by a network element (NE) in a network, comprising:
receiving preferred path route (PPR) information comprising a PPR identifier (PPR-ID) and a plurality of PPR-Path Description Elements (PPR-PDEs), the PPR-ID identifying a PPR graph representing a plurality of PPRs between one or more ingress NEs and one or more egress NEs, each PPR-PDE of the plurality of PPR-PDEs describing an element on the PPR graph, and the NE is an ingress NE of the one or more ingress NEs;
receiving backup PPR information for the ingress NE, the backup PPR information describing at least two backup PPR graphs between the ingress NE and the one or more egress NEs in the network, each backup PPR graph of the at least two backup PPR graphs comprising a plurality of backup PPRs between the ingress NE and an egress NE of the one or more egress NEs, the backup PPR information for the ingress NE including a backup PPR flag indicating a backup PPR graph of the at least two backup PPR graphs along which to forward a data packet in response to a failure occurring on the PPR graph; and
updating a forwarding database to include a forwarding entry comprising the PPR-ID and a PPR-PDE for a next backup element based on the backup PPR information; and
forwarding the data packet to the next backup element in response to the failure occurring on the PPR graph.

14. The method of claim 13, wherein a destination of the at least two backup PPR graphs is the egress NE.

15. The method of claim 13, wherein the backup PPR information for the at least two backup PPR graphs comprises a plurality of PPR-PDEs describing a plurality of backup elements included in each backup PPR graph of the at least two backup PPR graphs.

16. The method of claim 13, wherein the backup PPR flag is a 1 bit field set to indicate the backup PPR graph of the at least two backup PPR graphs.

17. The method of claim 13, wherein the forwarding the data packet to the next backup element is based on the backup PPR information instead of the PPR information, the method further comprising:
determining that the next backup element on the PPR graph is unavailable;
searching the forwarding database to determine another backup element on the backup PPR graph along which to forward the data packet in response to the next element on the PPR graph being unavailable;
replacing the PPR-ID included in the data packet with a backup PPR-ID identifying the backup PPR graph; and
transmitting the data packet to the other backup element on the backup PPR graph based on the backup PPR information stored at the forwarding database.

18. The method of claim 13, wherein the PPR graph comprises a plurality of ingress NEs, wherein each PPR-PDE of the plurality of PPR-PDEs for each ingress NE of the plurality of ingress NEs includes a source flag.

19. The method of claim 13, further comprising:
receiving the data packet including a backup PPR-ID identifying the backup PPR graph.

20. The method of claim 13, further comprising forwarding the PPR information and the backup PPR information to a plurality of other NEs in the network.

* * * * *